United States Patent
Kawaguchi

(10) Patent No.: US 11,175,632 B2
(45) Date of Patent: Nov. 16, 2021

(54) ELECTRONIC TIMEPIECE AND MOTOR CONTROLLER

(71) Applicant: Seiko Epson Corporation, Tokyo (JP)

(72) Inventor: Takashi Kawaguchi, Shiojiri (JP)

(73) Assignee: Seiko Epson Corporation

( * ) Notice: Subject to any disclaimer, the term of this patent is extended or adjusted under 35 U.S.C. 154(b) by 51 days.

(21) Appl. No.: 16/828,007

(22) Filed: Mar. 24, 2020

(65) Prior Publication Data

US 2020/0310353 A1  Oct. 1, 2020

(30) Foreign Application Priority Data

Mar. 25, 2019 (JP) .............................. JP2019-056638

(51) Int. Cl.
*G04C 3/14* (2006.01)
*H02P 8/02* (2006.01)

(52) U.S. Cl.
CPC ................ *G04C 3/143* (2013.01); *H02P 8/02* (2013.01)

(58) Field of Classification Search
CPC .................................. G04C 3/143; H02P 8/02
See application file for complete search history.

(56) References Cited

U.S. PATENT DOCUMENTS

| | | | |
|---|---|---|---|
| 4,542,329 A | 9/1985 | Xuan | |
| 5,530,326 A * | 6/1996 | Galvin | H02P 6/185 |
| | | | 318/400.11 |
| 2010/0001673 A1 | 1/2010 | Cardoletti et al. | |
| 2011/0156522 A1* | 6/2011 | Babcock | H02K 21/24 |
| | | | 310/156.43 |
| 2012/0001673 A1 | 1/2012 | Hurrell | |
| 2012/0307602 A1* | 12/2012 | Namekawa | G04G 19/10 |
| | | | 368/204 |

FOREIGN PATENT DOCUMENTS

| JP | H02-033108 A | 2/1990 |
|---|---|---|
| JP | 2009-542186 A | 11/2009 |

* cited by examiner

*Primary Examiner* — Zoheb S Imtiaz
(74) *Attorney, Agent, or Firm* — Harness, Dickey & Pierce, P.L.C.

(57) ABSTRACT

An electronic timepiece detects an external magnetic field without using a magnetic sensor. The electronic timepiece has a driver that drives a motor; a current detector that detects a current value flowing through a coil of the motor; a controller that controls the driver to the on state or the off state according to the detected current value; a polarity changer that alternately changes the polarity of the drive current to a first polarity and a second polarity when an on time, which is a continuous time of the on state, meets a specific condition; a counter that counts the number of on states in the first polarity and the number of on states in the second polarity; and an external magnetic field detector that detects an external magnetic field based on a result of comparing the counted number of on states in the first polarity and the second polarity.

8 Claims, 15 Drawing Sheets

ELECTRONIC TIMEPIECE AND MOTOR CONTROLLER

BACKGROUND

1. Technical Field

The present invention relates to an electronic timepiece, a movement, and a motor controller.

The present application claims priority based on and incorporates by reference the entire contents of Japanese Patent Application No. 2019-056638 filed on Mar. 25, 2019.

2. Related Art

JP-T-2009-542186 describes a technique for controlling continuous rotation of a motor by turning the supply of current to the coil of the motor off when the current flow through the coil exceeds an upper threshold, and on when the current flow goes below a lower threshold, and estimating the position of the rotor of the motor from the on time that power supply continues and the off time during which the power supply is continuously off.

The control technique in JP-T-2009-542186 cannot correctly estimate the position of the rotor when exposed to the effects of an external magnetic field, and operating errors can result. Detecting the external magnetic field and increasing accuracy estimating the rotor position with consideration for this field effect is therefore desirable. Providing a magnetic sensor is one possible solution, but providing a magnetic sensor increases the size of the movement and the cost of parts. Accurately detecting an external magnetic field without using a magnetic sensor is therefore desirable.

SUMMARY

An electronic timepiece according to an aspect of the present disclosure includes: a motor having a coil and a rotor; a driver controlled to an on state supplying drive current to the coil, or an off state not supplying drive current; a current detector configured to detect a current value flowing through the coil; a controller configured to control the driver to the on state or the off state according to the current value detected by the current detector; a polarity changer that alternately changes the polarity of the drive current to a first polarity and a second polarity when an on time, which is a continuous time of the on state of the driver, or an off time, which is a continuous time of the off state of the driver, meets a specific condition; a counter configured to count the number of on states in the first polarity and the number of on states in the second polarity, or the number of off states in the first polarity and the number of off states in the second polarity; and an external magnetic field detector configured to detect an external magnetic field based on a result of comparing the number of on states in the first polarity and the number of on states in the second polarity, or comparing the number of off states in the first polarity and the number of off states in the second polarity, the number of on states and the number of off states counted by the counter.

An electronic timepiece according to another aspect of the present disclosure includes: a motor having a coil and a rotor; a driver controlled to an on state supplying drive current to the coil, or an off state not supplying drive current; a current detector configured to detect a current value flowing through the coil; a controller configured to control the driver to the on state or the off state according to the current value detected by the current detector; a polarity changer that alternately changes the polarity of the drive current to a first polarity and a second polarity when an on time, which is a continuous time of the on state of the driver, or an off time, which is a continuous time of the off state of the driver, meets a specific condition; and an external magnetic field detector configured to detect an external magnetic field based on a result of comparing an on time in the first polarity and an on time in the second polarity, or comparing an off time in the first polarity and an off time in the second polarity.

In an electronic timepiece according to another aspect of the present disclosure, the controller controls the driver to resume driving the motor after stopping the motor for a specific time when the external magnetic field detector detects the external magnetic field.

In an electronic timepiece according to another aspect of the present disclosure, the controller outputs to the driver a fixed pulse that continues the on time for a specific time or longer when the external magnetic field detector detects the external magnetic field.

In an electronic timepiece according to another aspect of the present disclosure, the external magnetic field detector is configured to detect an external magnetic field based on a result of comparing a maximum value of the on time in the first polarity not including the first on time, and a maximum value of the on time in the second polarity not including the first on time.

Another aspect of the present disclosure is a movement including: a motor having a coil and a rotor; a driver controlled to an on state supplying drive current to the coil, or an off state not supplying drive current; a current detector configured to detect a current value flowing through the coil; a controller configured to control the driver to the on state or the off state according to the current value detected by the current detector; a polarity changer that alternately changes the polarity of the drive current to a first polarity and a second polarity when an on time, which is a continuous time of the on state of the driver, or an off time, which is a continuous time of the off state of the driver, meets a specific condition; a counter configured to count the number of on states in the first polarity and the number of on states in the second polarity, or the number of off states in the first polarity and the number of off states in the second polarity; and an external magnetic field detector configured to detect an external magnetic field based on a result of comparing the number of on states in the first polarity and the number of on states in the second polarity, or comparing the number of off states in the first polarity and the number of off states in the second polarity, the number of on states and the number of off states counted by the counter.

A movement according to another aspect of the present disclosure includes: a motor having a coil and a rotor; a driver controlled to an on state supplying drive current to the coil, or an off state not supplying drive current; a current detector configured to detect a current value flowing through the coil; a controller configured to control the driver to the on state or the off state according to the current value detected by the current detector; a polarity changer that alternately changes the polarity of the drive current to a first polarity and a second polarity when an on time, which is a continuous time of the on state of the driver, or an off time, which is a continuous time of the off state of the driver, meets a specific condition; and an external magnetic field detector configured to detect an external magnetic field based on a result of comparing an on time in the first polarity and an on time in the second polarity, or comparing an off time in the first polarity and an off time in the second polarity.

Another aspect of the present disclosure is a motor controller including: a driver controlled to an on state supplying drive current to a coil of a motor, or an off state not supplying drive current; a current detector configured to detect a current value flowing through the coil; a controller configured to control the driver to the on state or the off state according to the current value detected by the current detector; a polarity changer that alternately changes the polarity of the drive current to a first polarity and a second polarity when an on time, which is a continuous time of the on state of the driver, or an off time, which is a continuous time of the off state of the driver, meets a specific condition; a counter configured to count the number of on states in the first polarity and the number of on states in the second polarity, or the number of off states in the first polarity and the number of off states in the second polarity; and an external magnetic field detector configured to detect an external magnetic field based on a result of comparing the number of on states in the first polarity and the number of on states in the second polarity, or comparing the number of off states in the first polarity and the number of off states in the second polarity, the number of on states and the number of off states counted by the counter.

A motor controller according to another aspect of the present disclosure includes: a driver controlled to an on state supplying drive current to a coil of a motor, or an off state not supplying drive current; a current detector configured to detect a current value flowing through the coil; a controller configured to control the driver to the on state or the off state according to the current value detected by the current detector; a polarity changer that alternately changes the polarity of the drive current to a first polarity and a second polarity when an on time, which is a continuous time of the on state of the driver, or an off time, which is a continuous time of the off state of the driver, meets a specific condition; and an external magnetic field detector configured to detect an external magnetic field based on a result of comparing an on time in the first polarity and an on time in the second polarity, or comparing an off time in the first polarity and an off time in the second polarity.

Other objects and attainments together with a fuller understanding of the invention will become apparent and appreciated by referring to the following description and claims taken in conjunction with the accompanying drawings.

DESCRIPTION OF EMBODIMENTS

Embodiment 1

An electronic timepiece 1 according to the first embodiment of the present disclosure is described below.

Figure 1:
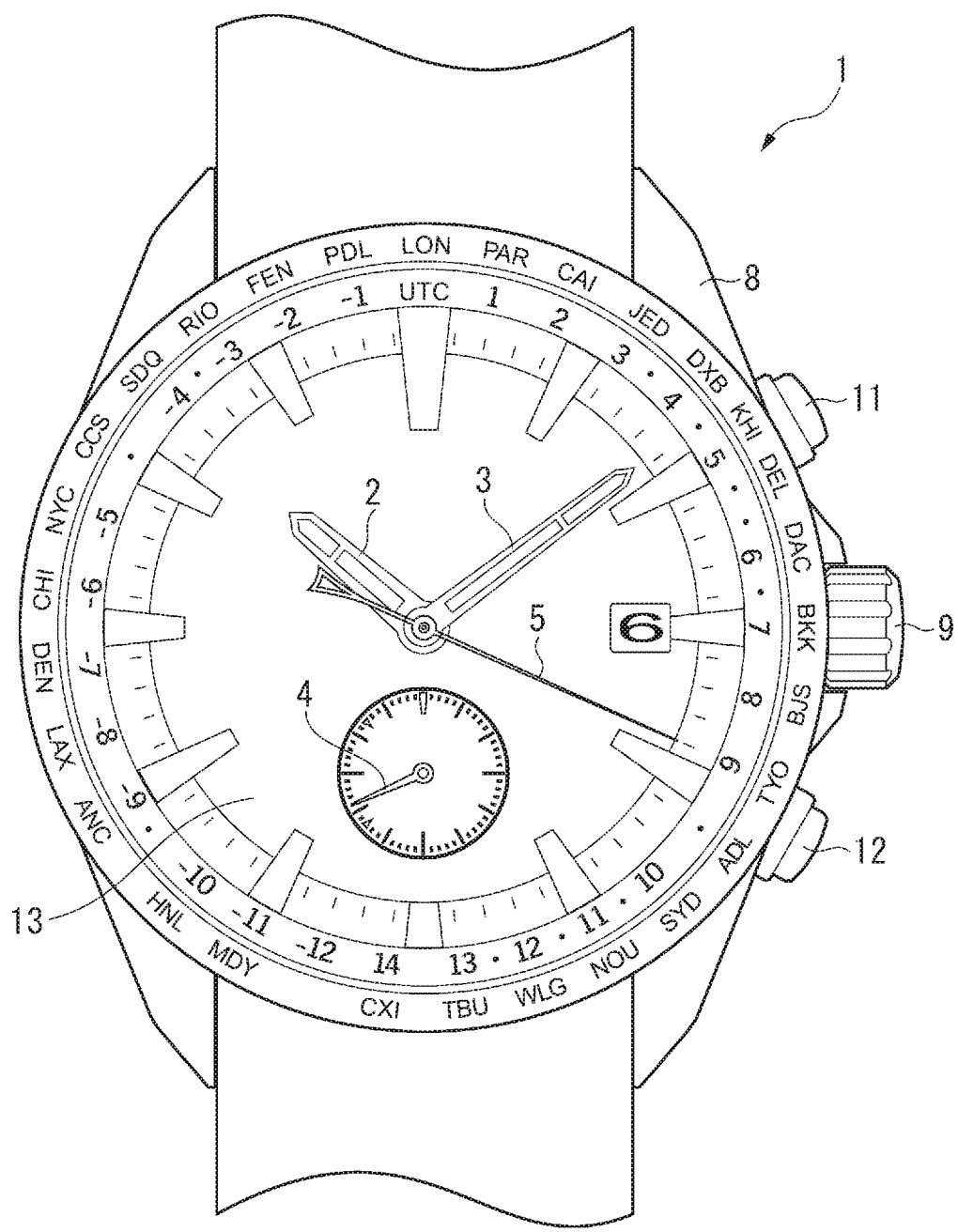
FIG. 1 is a front view of an electronic timepiece according to the first embodiment.

As shown in FIG. 1, the electronic timepiece 1 is an analog electronic timepiece having a world time function. The electronic timepiece 1 has an hour hand 2 and minute hand 3 as center hands, a small secondhand 4 at the 6:00 position, a city hand 5 disposed coaxially to the hour hand 2 and minute hand 3 and used to indicate the time zone, a crown 9, buttons 11 and 12, and a case 8 that houses the movement.

The hour hand 2, minute hand 3, and city hand 5 are disposed to three pivots located in the center of the dial 13 in a plan view perpendicular to the surface of the dial 13 of the electronic timepiece 1.

The small second hand 4 is attached to a pivot disposed separately from the other pivots towards 6:00 from the center of the dial 13 in plan view.

Circuit Configuration of the Electronic Timepiece

Figure 2:
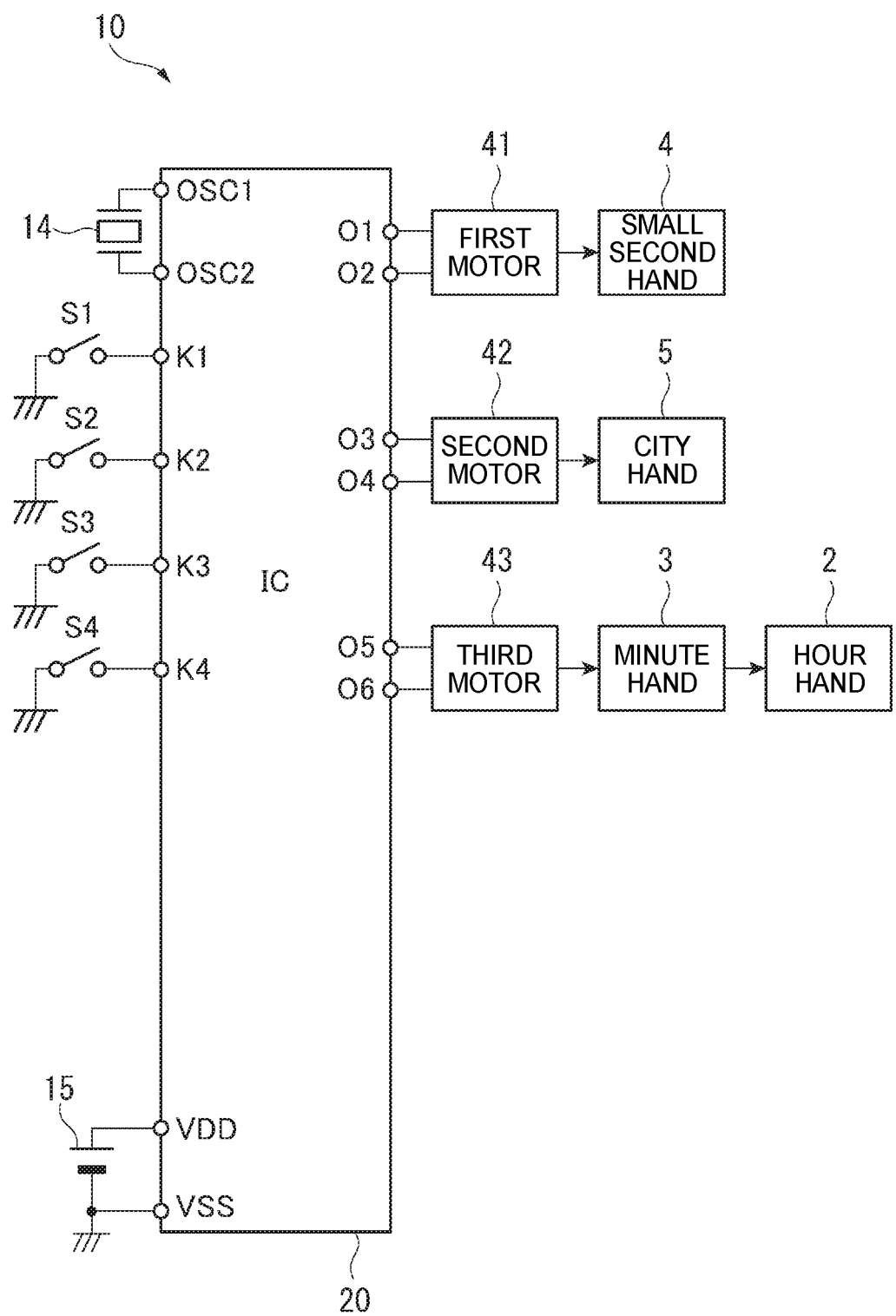
FIG. 2 is a circuit diagram illustrating the circuit configuration of the electronic timepiece according to the first embodiment.

As shown in FIG. 2, the movement 10 of the electronic timepiece 1 includes a crystal oscillator 14, which is a signal source, a battery 15 as a power supply, push switches S1 and S2 that turn on and off in conjunction with operation of the buttons 11 and 12, slide switches S3 and S4 that turn on and off in conjunction with the crown 9 moving in and out, a first motor 41 a second motor 42, a third motor 43, and an IC chip 20.

Motor Configuration

Figure 3:
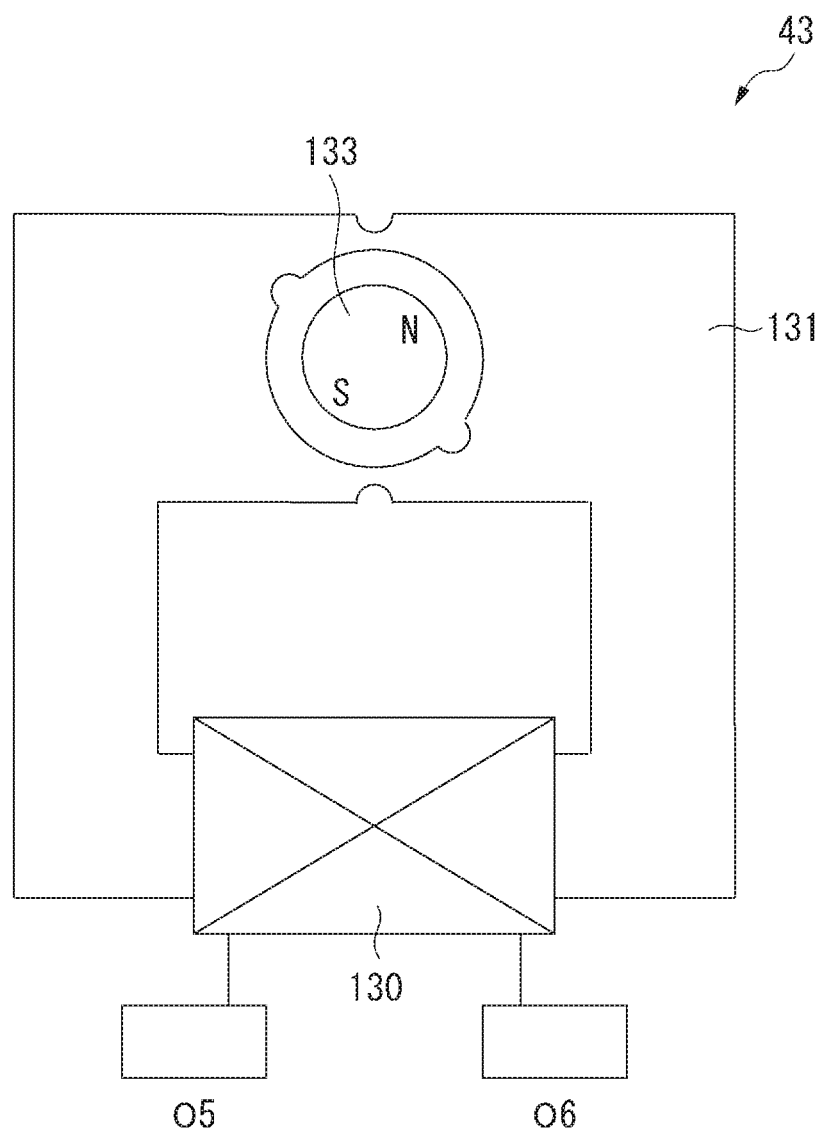
FIG. 3 illustrates the configuration of a motor of the electronic timepiece according to the first embodiment.

As shown in FIG. 3, the third motor 43 has a stator 131, a coil 130, and a rotor 133. The ends of the coil 130 have continuity with the output terminals O5 and O6 of the driver 51 described below. The rotor 133 is a magnet magnetized with two poles in the radial direction. The third motor 43 is therefore a two pole, single phase stepper motor used in electronic timepieces, and as described below is driven by a drive signal input to the driver 51.

The first motor 41 and second motor 42 are two pole, single phase stepper motors identical to the third motor 43, and further description thereof is omitted.

As shown in FIG. 2, the small second hand 4 is moved by the first motor 41, and indicates the second of the current time.

The city hand 5 is driven by the second motor 42, and indicates the name of a city in the set time zone.

The minute hand 3 and hour hand 2 are driven by the third motor 43. As a result, the minute hand 3 indicates the minute in 180 steps per rotation, and the hour hand 2 indicates the hour in 2160 steps per rotation.

As shown in FIG. 2, the IC chip 20 has connection terminals OSC1 and OSC2 to which the crystal oscillator 14 is connected, input terminals K1, K2, K3, and K4 to which the switches S1, S2, S3, S4 are connected, power supply terminals VDD and VSS to which the battery 15 is connected, and output terminals O1 to O6 to which the coils 130 of the first motor 41 to third motor 43 are connected.

Note that in this embodiment the positive pole of the battery 15 connects to the power supply terminal VDD on the high potential side, the negative pole connects to the power supply terminal VSS on the low potential side, and the power supply terminal VSS on the low potential side is set to ground (a reference potential).

The crystal oscillator 11 is driven by an oscillation circuit 21 described below and produces an oscillation signal.

The battery 15 is a primary battery or a storage battery. If a storage battery, the battery 15 may be charged by solar cell not shown, for example.

Switch S1 in this example is a push switch that operates in conjunction with operation of the button 11 disposed near the 2:00 position of the electronic timepiece 1, turns on when the button 11 is depressed, and is off when the button 11 is not depressed.

Switch S2 is a push switch that operates in conjunction with operation of the button 12 disposed near the 4:00 position of the electronic timepiece 1, turns on when the button 12 is depressed, and is off when the button 12 is not depressed.

Switches S3 and S4 are slide switches that operate in conjunction with the crown 9 moving in and out. In this embodiment, when the crown 9 is pulled out to the first stop, switch S3 is on and switch S4 is off; when at the second stop, switch S4 is on and switch S3 is off; and when at the 0 stop, switch S3 and switch S4 are both off.

Circuit Configuration of the IC Chip

Figure 4:
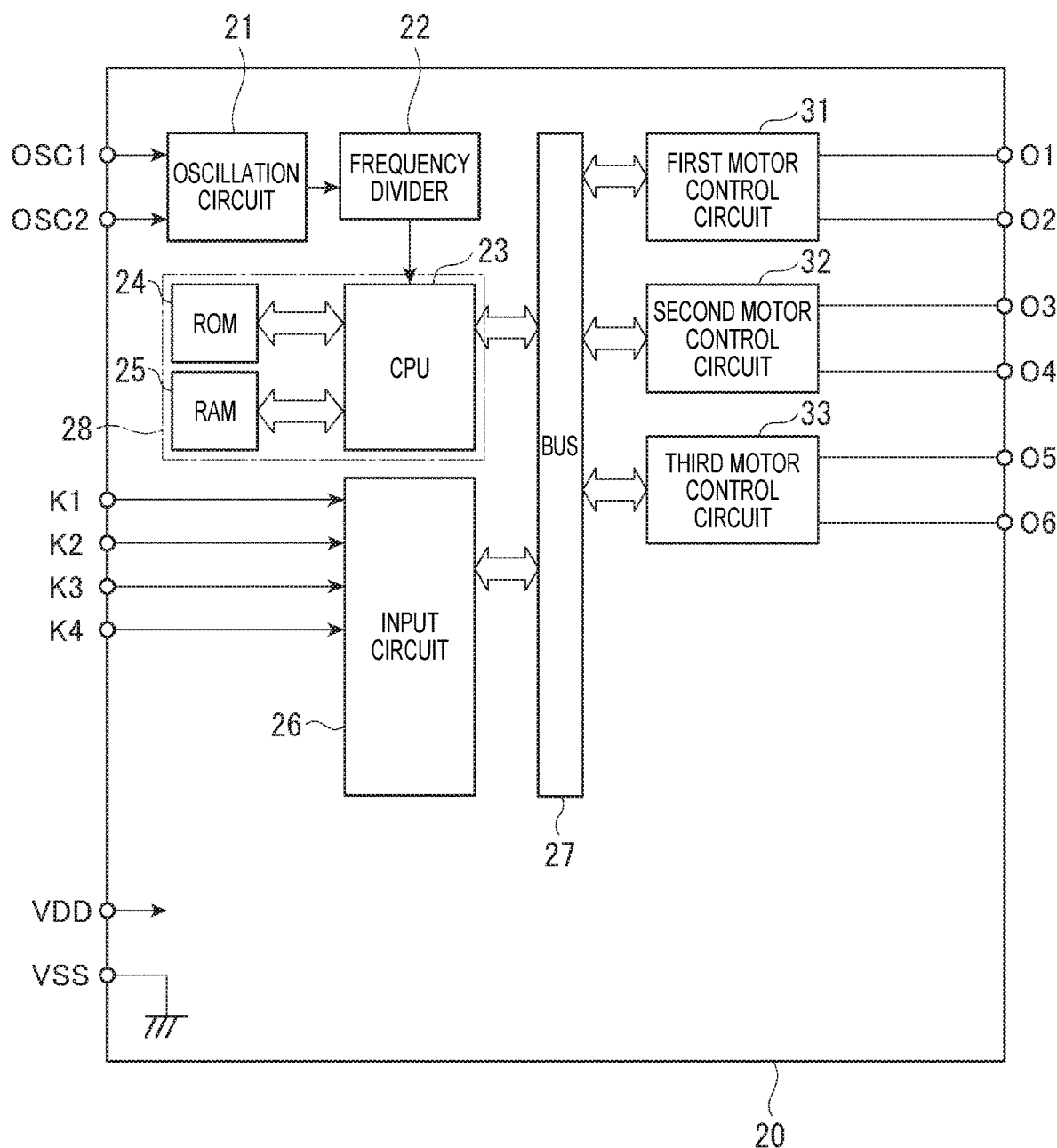
FIG. 4 is a block diagram illustrating the configuration of an IC in the electronic timepiece according to the first embodiment.

As shown in FIG. 4, the IC chip 20 includes an oscillation circuit 21, frequency divider 22, CPU 23 for controlling the electronic timepiece 1, ROM 24, RAM 25, an input circuit 26, and a bus 27.

CPU is an abbreviation for central processing unit, ROM is an abbreviation for read only memory, and RAM is an abbreviation for random access memory.

The IC chip 20 also includes a first motor control circuit 31 that controls the first motor 41, a second motor control circuit 32 that controls the second motor 42, and a third motor control circuit 33 that controls the third motor 43.

The oscillation circuit 21 causes the crystal oscillator 14, which is a reference signal source shown in FIG. 2, to oscillate at a high frequency, and outputs an oscillation signal at a specific frequency (32768 Hz) produced by the high frequency oscillation to the frequency divider 22.

The frequency divider 22 frequency divides the output of the oscillation circuit 21, and supplies a timing signal (clock signal) to the CPU 23.

The ROM 24 stores programs executed by the CPU 23. In this embodiment, the ROM 24 stores, for example, a program for executing a basic timekeeping function and a rapid drive process of the third motor 43.

The RAM 25 is used as working memory when the CPU 23 runs a program.

The CPU 23 renders specific functions, as the drive control functions of the first motor control circuit 31, second motor control circuit 32, and third motor control circuit 33, using the programs stored in ROM 24 and the RAM 25.

The input circuit 26 outputs the state of the input terminals K1, K2, K3, and K4 to the bus 27. The bus 27 is used for data transfers between the CPU 23 and the input circuit 26, first motor control circuit 31, second motor control circuit 32, and third motor control circuit 33.

The first motor control circuit 31 to third motor control circuit 33 control driving the first motor 41 to third motor 43 according to commands input from the CPU 23 through the bus 27.

Motor Control Circuit Configuration

Because the first motor 41 moves the small second hand 4 once a second, the first motor control circuit 31 is a motor control circuit used in wristwatches, for example, and enables reducing power consumption.

More specifically, after outputting a primary drive pulse with a short pulse width, the first motor control circuit 31 measures the induced EMF of the coil 130 in the first motor 41 to determine whether or not the rotor 133 is turning, and if the rotor is not turning, outputs a compensating drive pulse of a fixed pulse width that is greater than the primary drive pulse to reliably make the rotor 133 turn. Note that the first motor control circuit 31 may drive the first motor 41 by a fixed pulse.

The second motor control circuit 32 controls the second motor 42 so that the city hand 5 can be driven in both forward and reverse directions, that is, both clockwise and counterclockwise. Therefore, the second motor control circuit 32 may be configured in any way enabling controlling driving the second motor 42 in both forward and reverse directions.

The third motor control circuit 33 is a control circuit capable of moving the hour hand 2 and minute hand 3 rapidly when adjusting the time difference according to the city hand 5.

Figure 5:
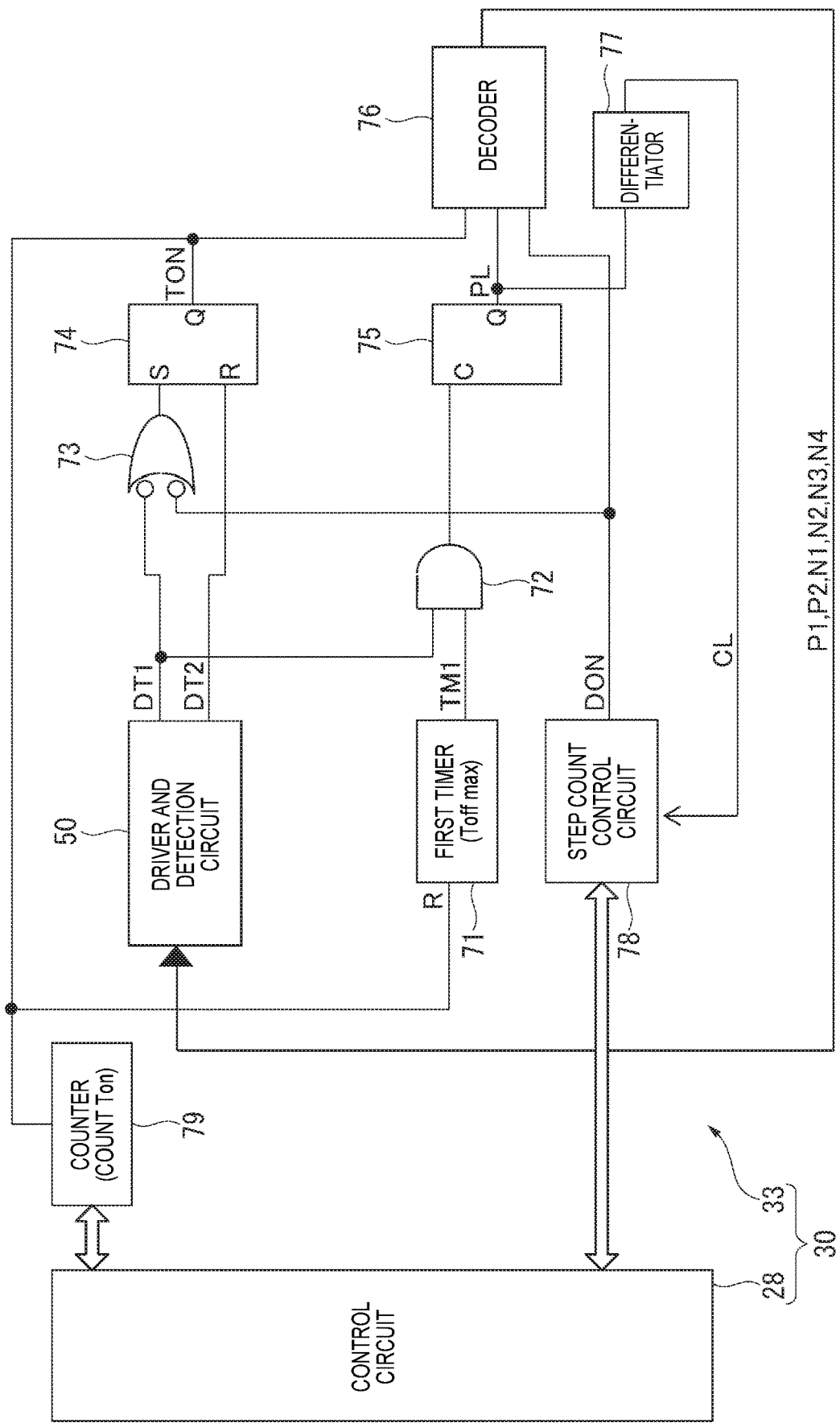
FIG. 5 is a circuit diagram illustrating the configuration of a motor controller in the first embodiment.

As shown in FIG. 5, the third motor control circuit 33 includes a driver and detection circuit 50, a first timer 71, OR circuit 73, SR latch 74, flip-flop 75, decoder 76, differentiator 77, step count control circuit 78, and counter 79.

Figure 6:
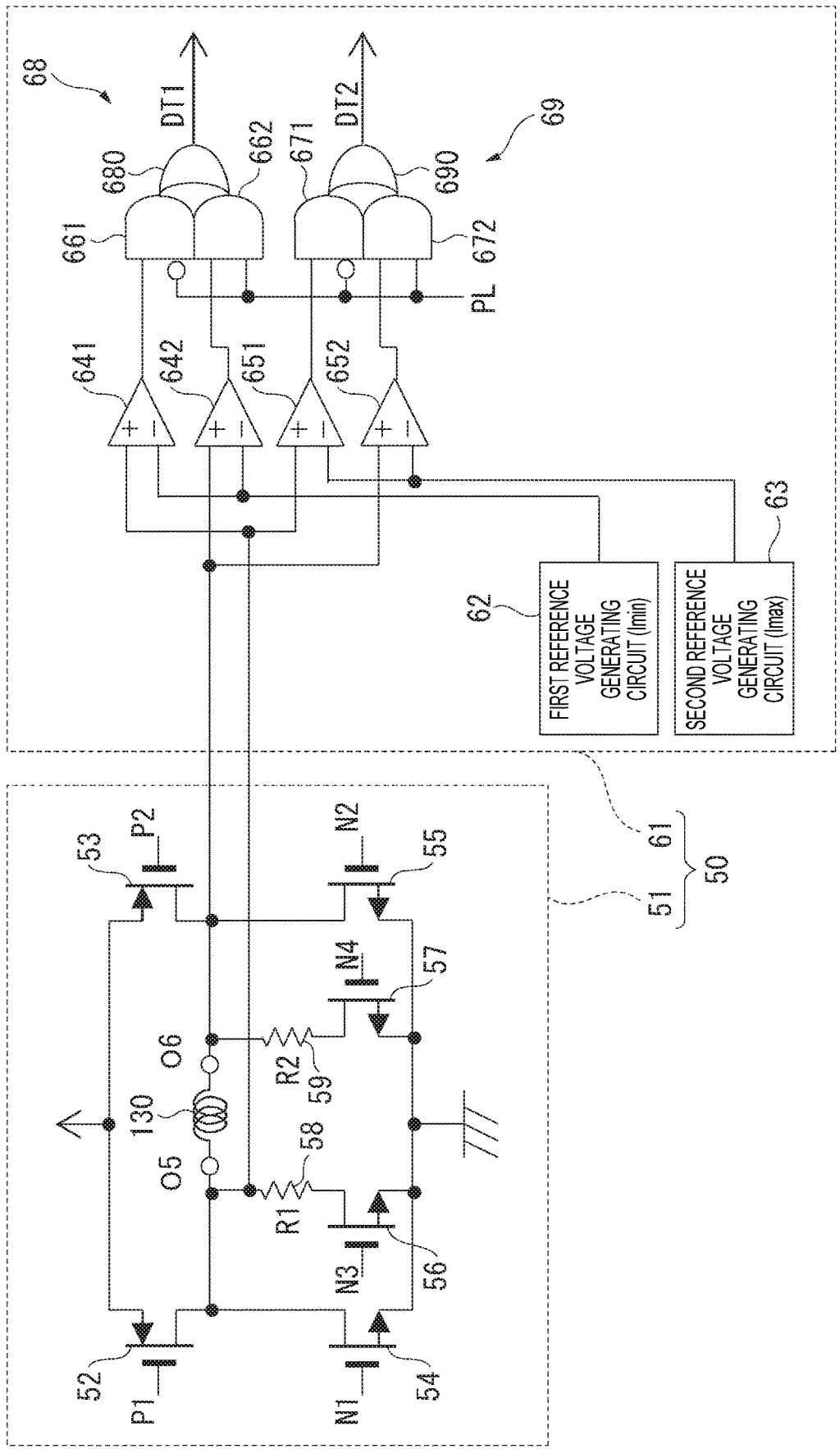
FIG. 6 is a circuit diagram illustrating the configuration of a driver and detection circuit in the first embodiment.

As shown in FIG. 6, the driver and detection circuit 50 includes a driver 51 that supplies current to the coil 130 of the third motor 43, and a current detection circuit 61 that determines whether or not the current flow through the coil 130 exceeds a specific value. The current detection circuit 61 is a current detector that detects a current value flowing through the coil 130. The driver 51 and current detection circuit 61 are described in detail below.

The first timer 71 is a timer that measures an evaluation time t1, which is a specific condition for changing the polarity of the current flow to the coil 130 of the third motor 43. If the reset terminal R of the first timer 71 goes High before the evaluation time t1 passes after the reset terminal R of the first timer 71 goes Low and the reset state is cleared, the output TM1 of the first timer 71 stays Low, but if the evaluation time t1 passes while the reset terminal R stays Low, the output TM1 goes High.

The step count control circuit 78 includes a presettable down counter, and outputs a drive period signal DON. The step count control circuit 78 outputs the drive period signal DON High until the preset value of the presettable down counter that is set by a setting signal input from the control circuit 28 through the bus 27 is counted down to 0 based on the clock signal CL, and the step count control circuit 78 outputs the drive period signal DON Low when the presettable down counter reaches 0.

Note that the setting signal input to the step count control circuit 78 is input from the CPU 23, for example, through the bus 27.

The output DT1 of the driver and detection circuit 50, and the output TM1 of the first timer 71, are input to the AND circuit 72.

The output DT1 of the driver and detection circuit 50 is inverted and input to the OR circuit 73, and the drive period signal DON output from the step count control circuit 78 is also inverted and input to the OR circuit 73.

The output of the OR circuit 73 is input to the set terminal S, and the output DT2 of the driver and detection circuit 50 is input to the reset terminal R, of the SR latch 74.

The SR latch 74 outputs from the output terminal Q a change signal TON to change the on/off state of the driver 51. The change signal TON is input to the decoder 76, the counter 79 and the reset terminal R of the first timer 71.

The output of the AND circuit 72 is input to the clock terminal C of the flip-flop 75.

The flip-flop 75 outputs from the output terminal Q a drive polarity signal PL that changes the polarity of the drive signal.

The differentiator 77 outputs a differential pulse at the rising edge and falling edge of the drive polarity signal PL.

The change signal TON output from the SR latch 74, the drive polarity signal PL output from the flip-flop 75, and the drive period signal DON output from the step count control circuit 78 are input to the decoder 76.

Based on the states of these signals, the decoder 76 outputs gate signals P1, P2, N1, N2, N3, N4 as drive signals to the driver 51 as shown in the timing chart in FIG. 12 described below.

The counter 79 is a counter that counts up according to change in the signal level of the input change signal TON. As a result, the counter 79 counts the number of times the driver 51 turns on or off within the drive period of one step, and in this example counts the number of times the driver 51 turns on.

The counter 79 in this embodiment is therefore a counter that counts the number of on states in the first polarity, and the number of on states in the second polarity.

As described above, the control circuit 28 is configured by a CPU 23, ROM 24, and RAM 25, operates according to a program stored in ROM 24, and reads and writes to the counter 79 and step count control circuit 78 through the bus 27. As described below, the control circuit 28 functions as an external magnetic field detector that detects an external magnetic field based on the number of on states in the first polarity and the number of on states in the second polarity counted by the counter 79.

Configuration of the Driver and Detection Circuit

As shown in FIG. 6, the driver and detection circuit 50 includes a driver 51 and a current detection circuit 61.

The driver 51 includes two p-channel transistors 52, 53, four n-channel transistors 54, 55, 56, 57, and two detection resistors 58, 59. The transistors 52 to 57 are controlled by the gate signals P1, P2, N1, N2, N3, N4 output from the decoder 76, and supply both forward and reverse current to the coil 130 of the third motor 43.

The current detection circuit 61 includes a first reference voltage generating circuit 62, a second reference voltage generating circuit 63, comparators 641, 642, 651, 652, and complex gates 68, 69.

Complex gate 68 is a single element comprising the same functions as a combination of the AND circuits 661, 662, and OR circuit 680 shown in FIG. 4. Complex gate 69 is a single element comprising the same functions as a combination of the AND circuits 671, 672, and OR circuit 690.

Comparators 641, 642 compare the voltages produced at the ends of the detection resistors 58, 59 of resistances R1, R2, and the voltage of the first reference voltage generating circuit 62.

Because the drive polarity signal PL is inverted and input to AND circuit 661, and the drive polarity signal PL is input without inversion to AND circuit 662, the output of the comparator 641 or 642 selected based on the drive polarity signal PL is output as the output DT1.

The comparators 651 and 652 compare the voltages produced at the ends of the detection resistors 58, 59 of resistances R1, R2, and the voltage of the second reference voltage generating circuit 63.

Because the drive polarity signal PL is input inverted to AND circuit 671, and the drive polarity signal PL is input without inversion to the AND circuit 672, the output of the comparator 651 or 652 selected according to the drive polarity signal PL is output as output DT2.

The first reference voltage generating circuit 62 is configured to output a potential equivalent to the voltage produced at the ends of the detection resistors 58, 59 when the current flow through the coil 130 is minimum current value Imin.

Therefore, when the current I flowing through the coil 130 is greater than or equal to minimum current value Imin, the voltage produced at the ends of the detection resistors 58, 59 exceeds the output voltage of the first reference voltage generating circuit 62, and the detection signal DT1 goes High. However, when the current I is less than minimum current value Imin, the detection signal DT1 goes Low.

As a result, the first reference voltage generating circuit 62, the comparators 641 and 642, and the complex gate 68 of the current detection circuit 61 form a minimum detector that detects when the current I flowing through the coil 130 is less than minimum current value Imin.

The second reference voltage generating circuit 63 produces a voltage equivalent to maximum current value Imax. Therefore, the detection signal DT2 of the current detection circuit 61 goes High when the current I flowing through the coil 130 exceeds the maximum current value Imax, and goes Low when the current I is less than or equal to the maximum current value Imax.

As a result, the second reference voltage generating circuit 63, the comparators 651 and 652, and the complex gate 69 of the current detection circuit 61 form a maximum detector that detects when the current I flowing through the coil 130 exceeds the maximum current value Imax.

In this example, the controller that controls the on states and off states of the driver 51 according to the current value the current detection circuit 61, which is a current detector, detects, that is, the detection signals DT1 and DT2 that are the current value detection results, is configured by the OR circuit 73, SR latch 74, and decoder 76.

In addition, the third motor control circuit 33, as described above, embodies a driver, current detector, controller, polarity changer, and counter, and because the control circuit 28 embodies an external magnetic field detector, a motor controller 30 is configured by the third motor control circuit 33 and control circuit 28.

Effect of External Magnetic Fields

The effect of an external magnetic field on the third motor 43 is described below with reference to FIG. 7 and FIG. 8.

Note that in this embodiment the current flow from terminal O5 through the coil 130 to terminal O6 is current in the forward direction. In addition, the drive current supplied to the coil 130 in this embodiment is switched between a first polarity and second polarity, and current flows in the forward direction through the coil 130 when in the first polarity.

Figure 7:
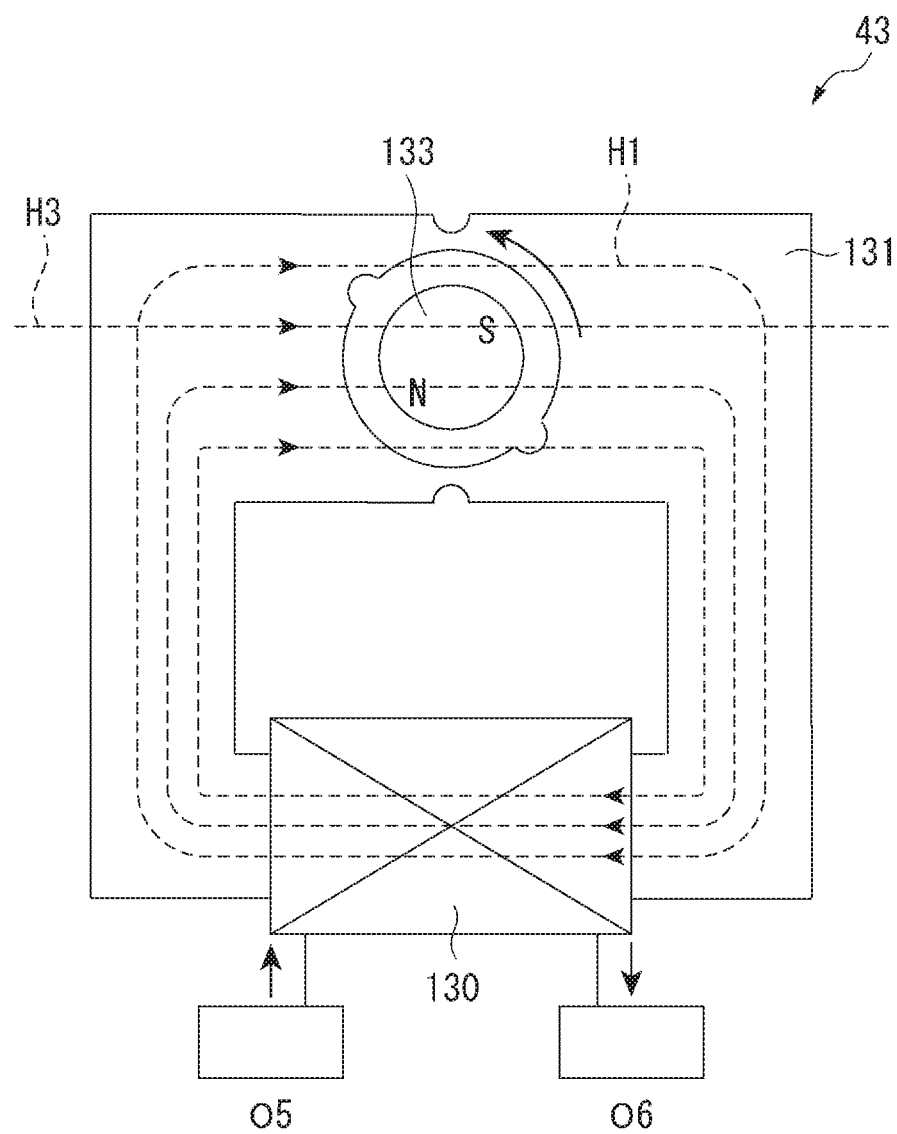
FIG. 7 illustrates the effect of an external magnetic field on the motor in the electronic timepiece.

FIG. 7 illustrates the current flow when the driver 51 is controlled to the on state by a drive signal of the first polarity, and in this embodiment when drive current flows forward through the coil 130, a clockwise magnetic field H1 is produced in the stator 131 as indicated by the dotted lines in FIG. 7.

Figure 8:
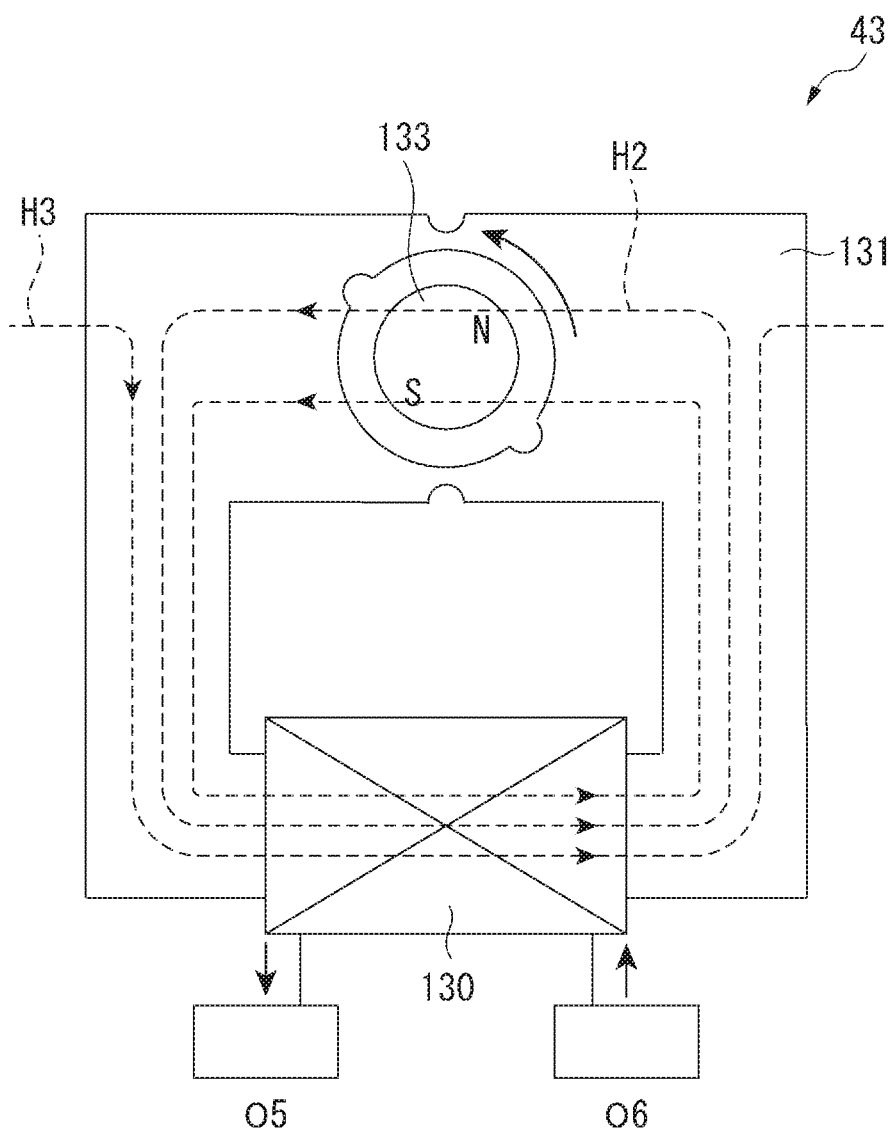
FIG. 8 illustrates the effect of an external magnetic field on the motor in the electronic timepiece.

FIG. 8 illustrates the current flow when the driver 51 is controlled to the on state by a drive signal of the second polarity, and in this embodiment when drive current flows in reverse through the coil 130, a counterclockwise magnetic field H2 is produced in the stator 131 as indicated by the dotted lines in FIG. 8.

The third motor control circuit 33 applies control to switch the drive current of the third motor 43 on and off between the maximum current value Imax and minimum current value Imin to maintain a substantially constant current. In this case there is a correlation between the angle of rotation of the rotor 133 and the on drive time and off drive time. As a result, if the polarity is changed when the on time and off time meet a specific condition, the polarity can be changed at the optimal timing.

However, as shown in FIG. 7 and FIG. 8, if an external magnetic field H3 affects the third motor 43, the external magnetic field H3 is added to the magnetic field H1 or H2 of the coil 130. This effect differs according to the drive polarity, and in a two-pole stepper motor is completely opposite. As a result, the drive polarity causes the movement of the rotor 133 to become unbalanced, the rise and fall times of the current vary, and the drive waveform during rated current drive differs according to the polarity.

For example, as shown in FIG. 7, when an external magnetic field H3 is applied in the same direction as the magnetic field H1 from the coil 130, the force applied to the rotor 133 is increased by the magnetic field. As a result, the rotor 133 turns more easily, the drive current rises more easily, and the on time Ton becomes shorter.

However, as shown in FIG. 8, when an external magnetic field H3 is applied in the opposite direction as the magnetic field H2 from the coil 130, the force applied to the rotor 133 is decreased by the magnetic field. As a result, the rotor 133 turns more difficultly, the drive current rises more difficulty, and the on time Ton becomes longer.

As described above, this embodiment detects differences in the drive waveform in the first polarity and second polarity produced when an external magnetic field is present, and thereby detects if an external magnetic field is present.

The operation of this embodiment is described below with reference to the flow charts in FIG. 9 to FIG. 11, and the timing chart in FIG. 12. Each time the button 11 is pushed and switch S1 inputs in this embodiment, the city hand 5 moves to the display position of the next city with a one hour time difference from the current position, and as the city hand 5 moves, the hour hand 2 and minute hand 3 are advanced rapidly to the positions +60 minutes ahead.

As a result, the control circuit 28 executes step S1 when there is input from switch S1 in response to operation of the button 11, and the drive pulse output from the second motor control circuit 32 causes the city hand 5 to move one step forward, that is, to the right (clockwise). The method of moving the city hand 5 can be controlled by control methods known from the literature, and further description thereof is omitted.

The control circuit 28 then executes step S2 and initializes variables m, Ton1, and Ton2 to 0. These variables are stored in CPU 23 memory or RAM 25, for example.

Variable m is a variable indicating the number of steps driven for external magnetic field evaluation.

Ton1 is a variable that stores the value of the counter 79 when the first iteration of the drive process for external magnetic field evaluation ends.

Ton2 is a variable that stores the value of the counter 79 when the second iteration of the drive process for external magnetic field evaluation ends.

Note that the third motor 43 is driven with different polarity in the first and second iterations of the drive process for external magnetic field evaluation.

Next, the control circuit 28 executes the external magnetic field evaluation drive process S10. When the control circuit 28 executes the external magnetic field evaluation drive process S10 as shown in FIG. 10, the control circuit 28 first executes step S11 and resets (initializes) the counter 79 that counts the on time count Ton.

Next, the control circuit 28 executes step S12 and sets the the number of steps to 1 in the step count control circuit 78. As a result, the first external magnetic field evaluation drive process S10 drives one step only. After the control circuit 28 sets the number of steps in the step count control circuit 78, drive control of the driver 51 is executed by the logic circuits of the third motor control circuit 33.

When 1 is set as the number of steps n in the step count control circuit 78, the step count control circuit 78 sets the drive period signal DON to High, and the decoder 76 executes step S13 to turn the driver 51 of the third motor 43 on by means of gate signals P1, P2, N1, N2, N3, N4. By turning the driver 51 on, the third motor 43 operates and the hour hand 2 and minute hand 3 are driven.

Note that in the flow charts and following description, turning the driver 51 on means controlling the driver 51 to an on state in which drive current can flow to the coil 130, and turning the driver 51 off means controlling the driver 51 to an off state in which drive current cannot flow to the coil 130.

Figure 12:
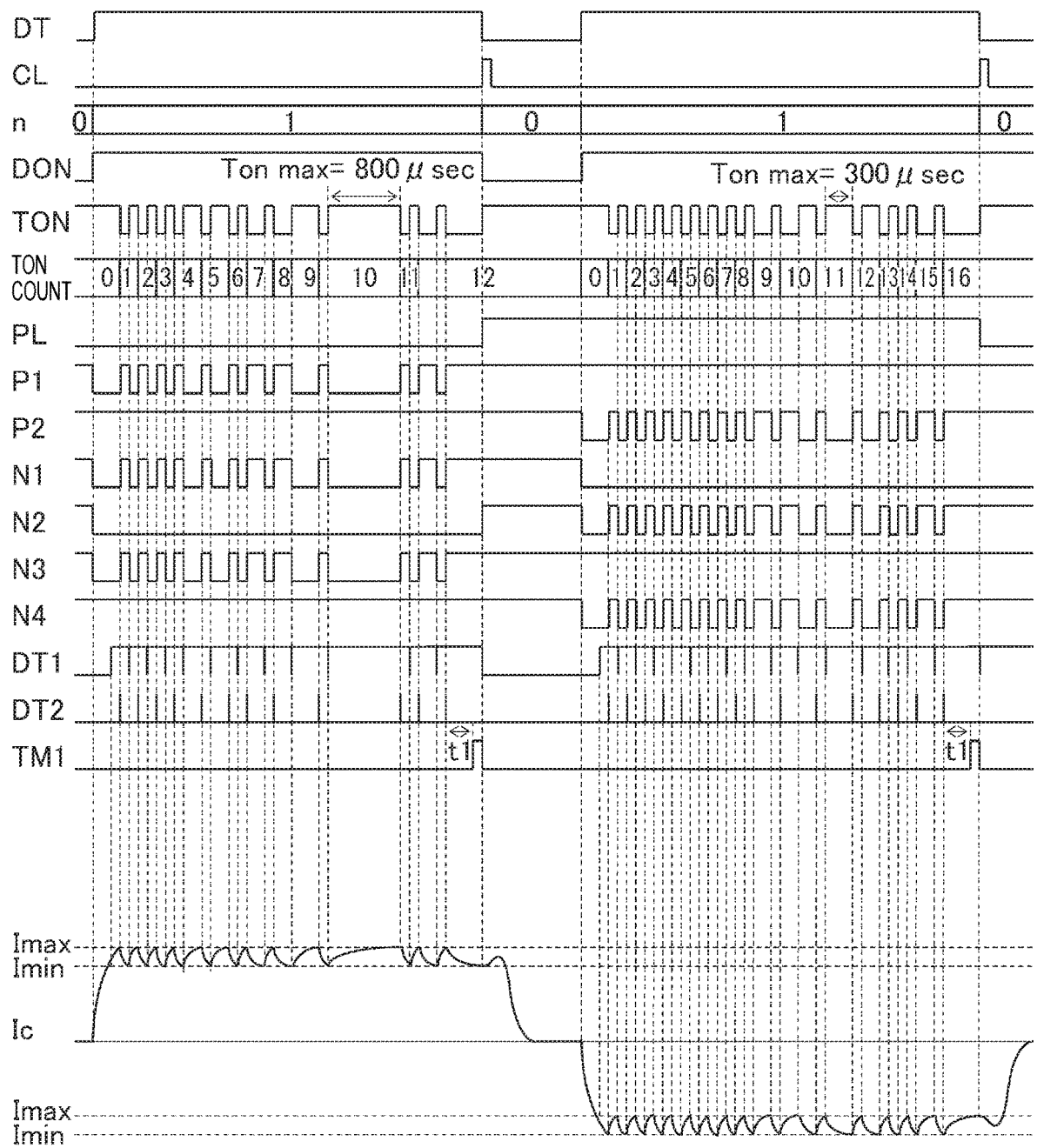
FIG. 12 is a timing chart of illustrating the operation of the motor control process in the first embodiment.

Note that as shown in the timing chart in FIG. 12, immediately after the drive period signal DON goes High in this embodiment, P1 is Low and P2 is High, and p-channel transistor 52 therefore turns on and and p-channel transistor 53 turns off. In addition, because N1 to N3 go Low, and N4 goes High, n-channel transistors 54, 55, 56 turn off and n-channel transistor 57 turns on. As a result, current flows through p-channel transistor 52, terminal O5, coil 130, terminal O6, detection resistor 59, and n-channel transistor 57.

In this embodiment, current flowing from terminal O5 to terminal O6 through the coil 130 is current flowing in the forward direction.

In this embodiment the drive current supplied to the coil 130 changes between a first polarity and a second polarity, and when set to the first polarity, current flows in the forward direction through the coil 130. Therefore, the state in which currents flows in the forward direction through the coil 130 is the state in which the driver 51 is controlled to the on state by a drive signal of the first polarity.

Next, the third motor control circuit 33 executes the process of step S14 to determine whether or not the current I flow through the coil 130 exceeds the maximum current value Imax. The third motor control circuit 33 returns NO in step S14 and then repeats the evaluation process of step S14 until the voltage produced in the detection resistors 58, 59 exceeds the reference voltage of the second reference voltage generating circuit 63.

However, if the current I exceeds the maximum current value Imax, the third motor control circuit 33 determines YES in step S14, and sets the detection signal DT2 High. When the detection signal DT2 goes High, the reset terminal R of the SR latch 74 goes High, and the change signal TON changes to Low. As a result, step S15 is executed, and the decoder 76 turns the driver 51 off by means of gate signals P1, P2, N1, N2, N3, N4. More specifically, P1 goes High, P2 goes High, N1 goes High, N2 goes Low, N3 goes High, and N4 goes High.

As a result, the ends of the coil 130 are connected to the power supply terminal VSS and shorted, and the supply of current from the driver 51 to the coil 130 stops.

Therefore, the state in which current is not supplied to the coil 130 is a state in which the driver 51 is controlled to the off state. In this embodiment the state in which p-channel transistors 52, 53 and n-channel transistor 55 are off, and n-channel transistors 54, 56, 57 are on is the off state of the driver 51 when driven by the first polarity.

When the change signal TON goes Low, the counter 79 executes step S16 and increases the count, that is, the on time count Ton, by 1.

When the change signal TON goes Low, resetting the first timer 71 is cancelled and the first timer 71 starts measuring time again. In addition, when the driver 51 is turned on and the change signal TON changes to High, the first timer 71 is reset and measuring the evaluation time t1 stops. Therefore, the first timer 71 starts measuring the off time, which is the continuous time of the off state of the driver 51.

Next, the third motor control circuit 33 executes step S17, and determines whether or not the current I flowing through the coil 130 dropped below the minimum current value Imin.

The third motor control circuit 33 returns NO in step S17 until the voltage produced by the detection resistor 58, 59 goes below the reference voltage of the first reference voltage generating circuit 62, and repeats the evaluation process of step S17.

The third motor control circuit 33 returns YES in step S17 when the current I goes below the minimum current value Imin, executes step S18, and determines whether or not the off time of the driver 51 exceeds the evaluation time t1.

In other words, if the time past between when the driver 51 turns off and the current I goes below the minimum current value Imin, that is, the off time, is less than or equal to the evaluation time t1, the third motor control circuit 33 determines NO in step S18, but if this elapsed time exceeds the evaluation time t1, the third motor control circuit 33 determines YES in step S18. More specifically, if the output TM1 is High when the current I goes below the minimum current value Imin and YES is determined in step S18, the off time of the driver 51 can be determined to have exceeded the evaluation time t1, but if the output TM1 is Low, the third motor control circuit 33 determines the evaluation time t1 has not been exceeded.

When the third motor control circuit 33 returns NO in step S18, the third motor control circuit 33 returns to step S13 without changing the polarity, turns the driver 51 on, and drives the third motor 43.

The relationship between the on time Ton, which is the time the driver 51 is on, the off time Toff, which is the time the driver 51 is off, the induced EMF V, drive voltage E, drive current i, and coil resistance R is shown in equation (1) below, and the optimal timing for changing the drive polarity can be estimated from the induced EMF V.

$$V = E*Ton/(Ton+Toff) - R*i \qquad (1)$$

As a result, when the off time Toff does not exceed the evaluation time t1, the third motor control circuit 33 determines NO in step S18, again turns the driver 51 on, and executes step S13 to resume supplying drive current to the coil 130.

If the off time Toff exceeds the evaluation time t1, the third motor control circuit 33 determines that the rotor 133 rotated 180 degrees, executes step S19 to change the polarity, and then executes step S20 to reduce the remaining number of steps n counted by the step count control circuit 78 by 1.

Next, the third motor control circuit 33 executes step S21 to determine if the remaining number of steps n is 0. If step S21 determines YES, the third motor control circuit 33 determines driving the number of steps n set in step S12, or more specifically driving the hour hand 2 and minute hand 3 one step, was completed and stops driving the third motor 43.

More specifically, if the remaining number of steps n counted by the step count control circuit 78 goes to 0, the step count control circuit 78 sets the drive period signal DON Low and ends drive control of the third motor 43.

In addition, the control circuit 28 executes step S22 and adds 1 to the variable m when the remaining number of steps n of the step count control circuit 78 goes to 0. As a result, variable m is set to 1 in the first iteration of the external magnetic field evaluation drive process S10.

The external magnetic field evaluation drive process S10 thus ends, and driving the third motor 43 by the third motor control circuit 33 also pauses.

Figure 9:
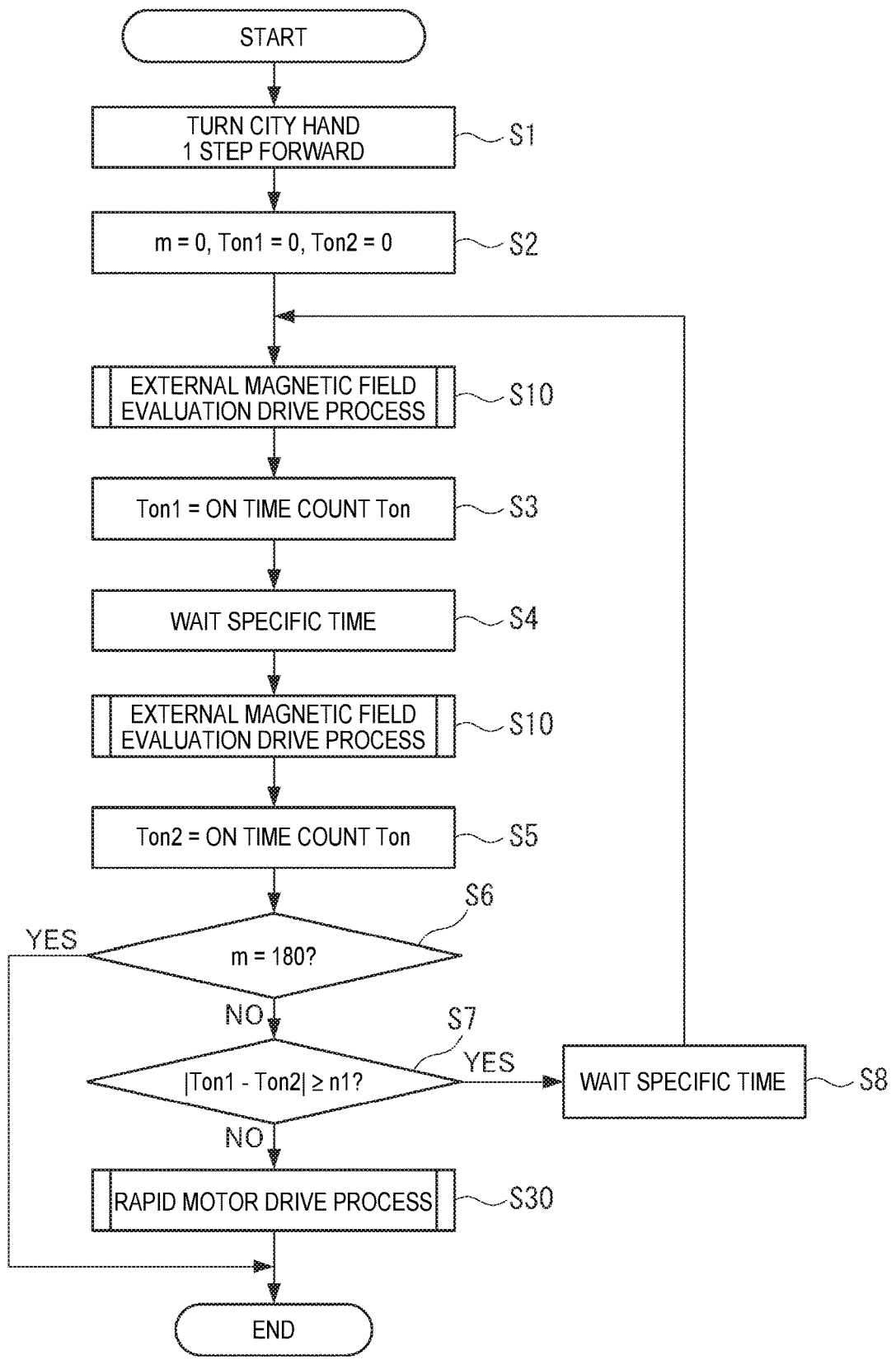
FIG. 9 is a flow chart describing the motor control process in the first embodiment.
Figure 10:
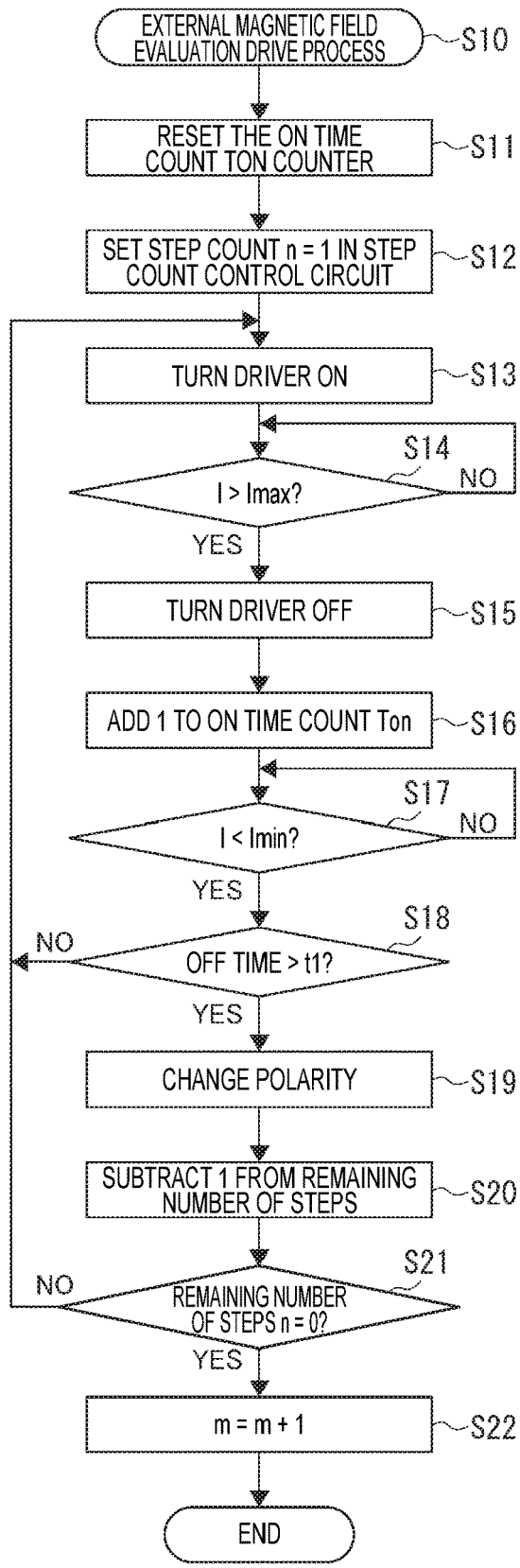
FIG. 10 is a flow chart describing the external magnetic field evaluation drive process in the first embodiment.

When the first iteration of the external magnetic field evaluation drive process S10 ends, the control circuit 28 goes to step S3 in FIG. 9, and stores the value of the counter 79, that is, the on time count Ton, to variable Ton1. In the example in FIG. 12, the count of the counter 79, that is, the on time count Ton, is 12 after the first iteration of the external magnetic field evaluation drive process S10, and 12 is therefore stored to variable Ton1 in step S3.

Next, the control circuit 28 executes step S4 and waits a specific time. More specifically, the control circuit 28 waits until vibration of the rotor 133 driven in the external magnetic field evaluation drive process S10 stops. This wait time is, for example, several msec.

Next, the control circuit 28 executes a second iteration of the external magnetic field evaluation drive process S10. The second iteration of the external magnetic field evaluation drive process S10 is the same as the first iteration, and further description thereof is omitted. When the second iteration of the external magnetic field evaluation drive process S10 ends, the variable m indicating the number of steps driven is two.

When the second iteration of the external magnetic field evaluation drive process S10 ends, the control circuit 28 executes step S5, and stores the value of the counter 79, that is, the on time count Ton, to variable Ton2. In the example in FIG. 12, the count of the counter 79, that is, the on time count Ton, is 16 after the second iteration of the external magnetic field evaluation drive process S10, and 16 is therefore stored to variable Ton1 in step S5.

Next, the control circuit 28 executes step S6 to determine whether or not m=180. Because the city hand 5 turned forward one step and the time was therefore advanced one hour, the minute hand 3 turns one rotation, that is, 180 steps. When the control circuit 28 determines YES in step S6 because m=180, the external magnetic field evaluation drive process S10 has executed 180 times, driving the minute hand 3 one rotation has ended, and drive control of the third motor 43 therefore ends.

If the control circuit 28 determines NO in step S6, the control circuit 28 executes step S7 to determine whether or not the absolute value of the difference between Ton1 and Ton2 is greater than or equal to a specific value n1. This specific value n1 can be set based on the results of tests applying an external magnetic field to the third motor 43, or simulations, and in this example n1=3.

If the control circuit 28 determines YES in step S7, the control circuit 28 determines that the drive waveform of the third motor 43 is unbalanced due to the effects of an external magnetic field. In the example in FIG. 12, the absolute value of the difference between Ton1 and Ton2 is 4, is therefore greater than or equal to the specific value n1, and the control circuit 28 can determine operation is being affected by an external magnetic field.

When YES is determined in step S7, the control circuit 28 does not execute the process driving the third motor 43 rapidly, and after waiting the specific time in step S8, returns to the first iteration of the external magnetic field evaluation drive process S10 and continues the drive process for external magnetic field detection. As in step S4, the wait time in step S8 may be set to a time at least long enough for rotor 133 vibration to stop.

This is because if the third motor 43 is driven rapidly while under the effect of an external magnetic field, the change polarity condition cannot be correctly evaluated, and driving the third motor 43 appropriately may not be possible. As a result, the control circuit 28 repeats step S8 and steps S10 to S7 as long as step S7 returns YES, that is, as long the effects of an external magnetic field are present. As a result, the first and second iterations of the external magnetic field evaluation drive process S10 execute at most 90 times each, or a total 180 times.

When the control circuit 28 determines NO in step S7, the control circuit 28 executes the the rapid motor drive process S30 to drive the third motor 43 quickly.

Figure 11:
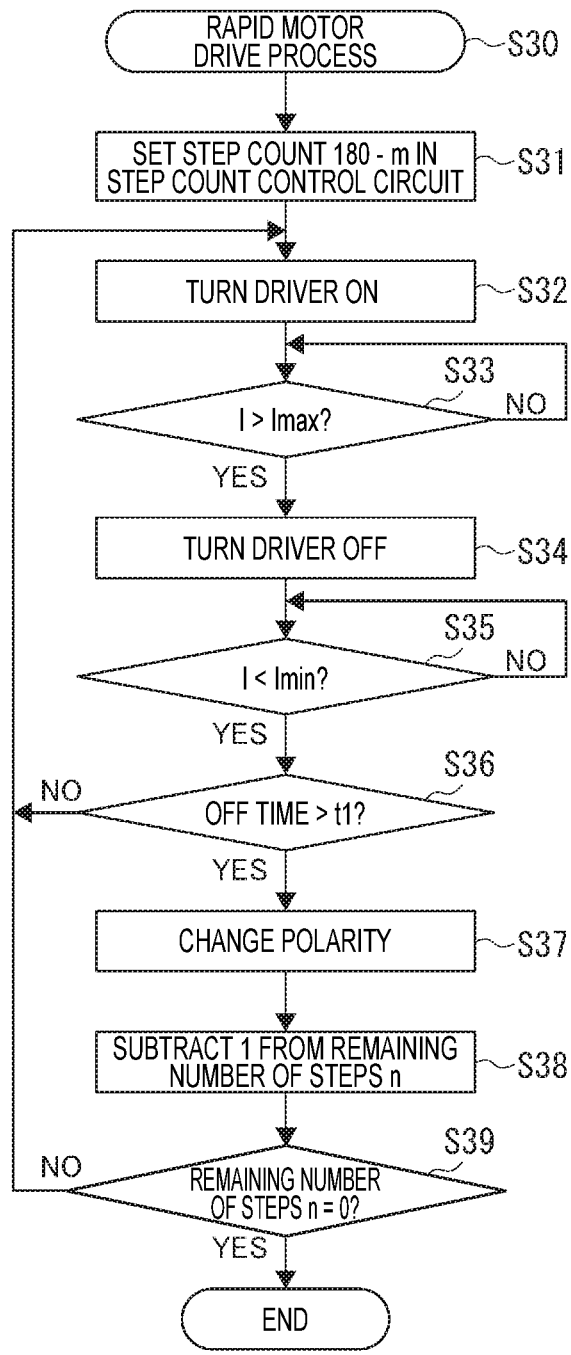
FIG. 11 is a flow chart describing of the rapid motor drive process in the first embodiment.

As shown in FIG. 11, when the control circuit 28 executes the rapid motor drive process S30, the control circuit 28 first executes step S31 and sets the number of steps in the step count control circuit 78 to 180−m. More specifically, to drive the minute hand 3 180 steps or one rotation, the control circuit 28 sets the remaining number of steps n to 180−m in the step count control circuit 78 because m steps have already been driven for external magnetic field detection.

When the control circuit 28 sets the number of drive steps in the step count control circuit 78, the third motor control circuit 33 drives the motor rapidly the set number of steps. In FIG. 11 steps S32 to S39 the third motor control circuit 33 executes are the same as steps S13 to S15, and steps S17 to S21 in the external magnetic field evaluation drive process S10, and further description thereof is omitted.

When the control circuit 28 determines YES in step S39 and ends the rapid motor drive process S30, the control circuit 28 returns to the process in FIG. 9, and stops drive control of the city hand 5 one step in the forward direction.

Effect of Embodiment 1

The third motor control circuit 33 in this embodiment calculates the difference between the on time count Ton when driving with a first polarity and the on time count Ton when driving with a second polarity in two consecutive iterations of the external magnetic field evaluation drive process S10, and can therefore determine the presence of an external magnetic field when the difference is greater than a specific value n1.

More specifically, if operation is affected by an external magnetic field when the third motor 43 is controlled by constant current drive, the movement of the rotor 133 will be unbalanced depending on the drive polarity, and because the drive waveform of constant current drive differs according to the polarity, the presence of an external magnetic field can be detected by comparing the on time counts Ton, which indicate the state of the drive waveform of each polarity.

There is therefore no need to provide a magnetic sensor to detect external magnetic fields, and increasing the size and parts cost of the movement 10 can be prevented. More specifically, the electronic timepiece 1 can accurately detect the effects of an external magnetic field without using a magnetic sensor, and can prevent driving the third motor 43 rapidly when exposed to the effects of an external magnetic field.

More particularly, an imbalance in the drive waveform when actually driving the third motor 43 can be determined based on the difference in the on time count Ton when starting rapid drive control of the third motor 43 that moves the hour hand 2 and minute hand 3, and that operation is affected by an external magnetic field can be determined when the calculated difference is greater than or equal to a specific value n1.

As a result, an external magnetic field that affects driving the third motor 43 can be accurately detected.

Because the rotor 133 is not driven continuously when an external magnetic field is present, and the third motor 43 is driven after waiting a specific time until the rotor 133 completely stops turning, the drive speed becomes slower but the third motor 43 can be driven stably even when affected by an external magnetic field.

Because the third motor control circuit 33 is configured by a dedicated circuit using logic devices, the third motor control circuit 33 enables low voltage drive and reduces power consumption compared with a configuration using a CPU 23, and is particularly well suited to a mobile electronic timepiece 1 such as a wristwatch.

Because the control circuit 28 sets the number of drive steps in the step count control circuit 78 of the third motor control circuit 33, and stores the count of the counter 79 to a variable, the actual drive control of the third motor 43 is handled by the third motor control circuit 33, and the program enabling the control circuit 28 can be simplified.

Furthermore, because an external magnetic field detector is configured by the control circuit 28, the specific value n1 used to evaluate if an external magnetic field is present can be written to nonvolatile memory, for example. As a result, the specific value n1 can be changed according to the differences in the specifications of the third motor 43 and differences in the magnetic shield structure in the movement 10, and the effects of an external magnetic field can be accurately detected in different variations of the electronic timepiece 1.

Variation of Embodiment 1

The counter 79 in the first embodiment counts the number of on states of the driver 51 when driven by a first polarity, and the number of on states of the driver 51 when driven by a second polarity, and the control circuit 28, which is an example of an external magnetic field detector, detects an external magnetic field based on the result of comparing the variable Ton1, which is the number of first polarity on states, and the variable Ton2, which is the number of second polarity on states, counted by the counter 79, but the disclosure is not so limited.

For example, the counter 79 may count the number of off states of the driver 51 when driven by a first polarity, and the number of off states of the driver 51 when driven by a second polarity, and the control circuit 28, which is an example of an external magnetic field detector, may detect an external magnetic field based on the results of comparing the number of first polarity off states and the number of second polarity off states counted by the counter 79.

Embodiment 2

An electronic timepiece according to the second embodiment is described next.

Figure 13:
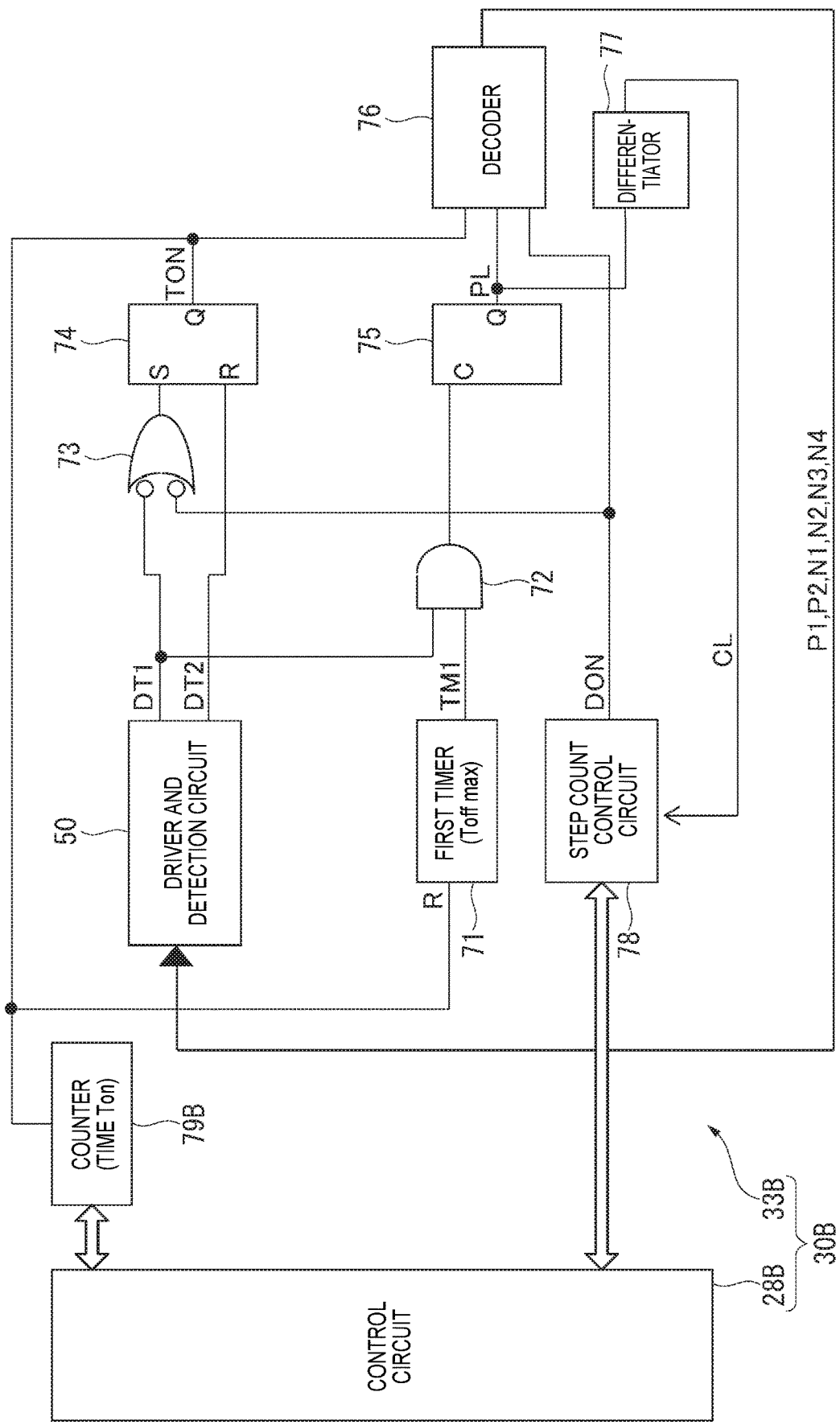
FIG. 13 is a circuit diagram illustrating the configuration of a motor controller in the second embodiment.

The electronic timepiece according to the second embodiment differs from the first embodiment in using the motor controller 30B shown in FIG. 13 instead of the motor controller 30 of the first embodiment, and as a result the control flow of the second embodiment also differs from the first embodiment. Primarily the configurations and processes that differ from the first embodiment are described below.

This motor controller 30B has a third motor control circuit 33B and a control circuit 28B. The third motor control circuit 33B differs only in using a counter 79B instead of the counter 79 of the third motor control circuit 33 in the first embodiment.

The counter 79 in the first embodiment counts the on time count Ton in each iteration of the external magnetic field evaluation drive process S10, but the counter 79B in this embodiment measures the on time Ton in the external magnetic field evaluation drive process, that is, measures the on time indicating how long the on state of the driver 51 continues. The control circuit 28B also evaluates and stores the maximum value of the on time Ton in the external magnetic field evaluation drive process as described below.

The operation of the second embodiment is described below with reference to the flow charts in FIG. 14 and FIG. 15.

When the button 11 is pushed and switch S1 inputs in this second embodiment, the control circuit 28B executes step S51 and moves the city hand 5 one step forward, that is, clockwise, by means of a drive pulse output from the second motor control circuit 32.

Next, the control circuit 28B executes step S52, and initializes each of variables m, Tonmax, Tonmax1, and Tonmax2 to 0. These variables are stored in CPU 23 memory or RAM 25, for example.

In this embodiment, variable m a variable indicating the number of steps driven for external magnetic field evaluation.

Tonmax is the maximum on time Ton, which is updated during execution of the external magnetic field evaluation drive process.

Tonmax1 is a variable storing the value of Tonmax when the first iteration of the drive process for external magnetic field evaluation ends.

Tonmax2 is a variable storing the value of Tonmax when the second iteration of the drive process for external magnetic field evaluation ends.

Note that the third motor 43 is driven with different polarity in the first and second iterations of the drive process for external magnetic field evaluation.

Next, the control circuit 28B executes the external magnetic field evaluation drive process S60. When the control circuit 28B executes the external magnetic field evaluation drive process S60 as shown in FIG. 15, the control circuit 28B first executes step S61 and initializes the variable Tonmax to 0.

Next, the control circuit 28B executes step S62 and sets the the number of steps to 1 in the step count control circuit 78. The control circuit 28B also executes step S63 and resets (initializes) the counter 79B that counts the on time Ton.

After the control circuit 28B sets the number of drive steps in the step count control circuit 78 and resets the counter 79B, the control circuit 28B controls driving the driver 51 by means of the logic circuits in the third motor control circuit 33B as in the first embodiment. Note that description of aspects of drive control by the third motor control circuit 33B that are the same as drive control by the third motor control circuit 33 described above is simplified below.

When the number of steps n is set to 1 in the step count control circuit 78, the third motor control circuit 33B executes the process of steps S64 to S66, which is the same as the process of steps S13 to S15 in the first embodiment.

Next, the control circuit 28B executes step S67 if this was the first time the driver 51 was turned on in step S64, that is, determines if this is the first on time Ton.

If the control circuit 28B returns NO in step S67, the control circuit 28B executes step S68 to determine whether or not the on time Ton measured by the counter 79B is greater than Tonmax.

If the control circuit 28B determines YES in step S68, the control circuit 28B updates Tonmax to the current on time Ton, and if the control circuit 28B returns NO in step S68, does not update Tonmax and leaves it unchanged.

The control circuit 28B also does not update Tonmax if the control circuit 28B determines YES in step S67. The reason Tonmax is updated other than at the first on time Ton is because, as shown in FIG. 12, the on time Ton in the first iteration of the process becomes longer because operation starts when the rotor 133 is stopped, and determining differences due to the polarity when subject to an external magnetic field is difficult.

When the control circuit 28B determines YES in step S67, the control circuit 28B determines NO in step S68, and after the control circuit 28B executes step S69, the control circuit 28B executes the process of steps S70 to S75, which is the same as the process of steps S17 to S22 in the first embodiment, and then ends the external magnetic field evaluation drive process S60.

As described above, when the external magnetic field evaluation drive process S60 ends, driving the third motor 43 by the third motor control circuit 33B also pauses.

Figure 14:
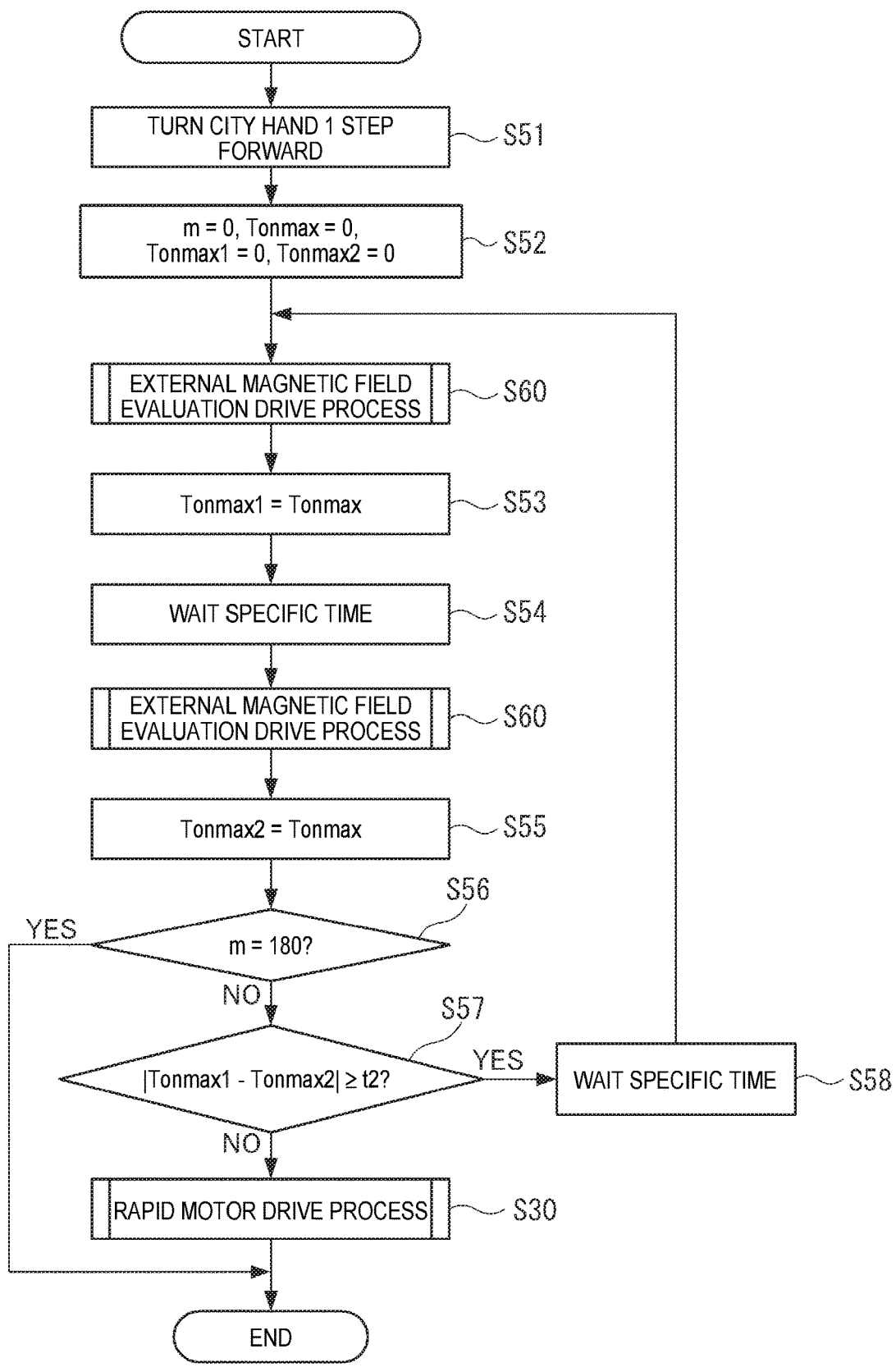
FIG. 14 is a flow chart of the motor control process in the second embodiment.
Figure 15:
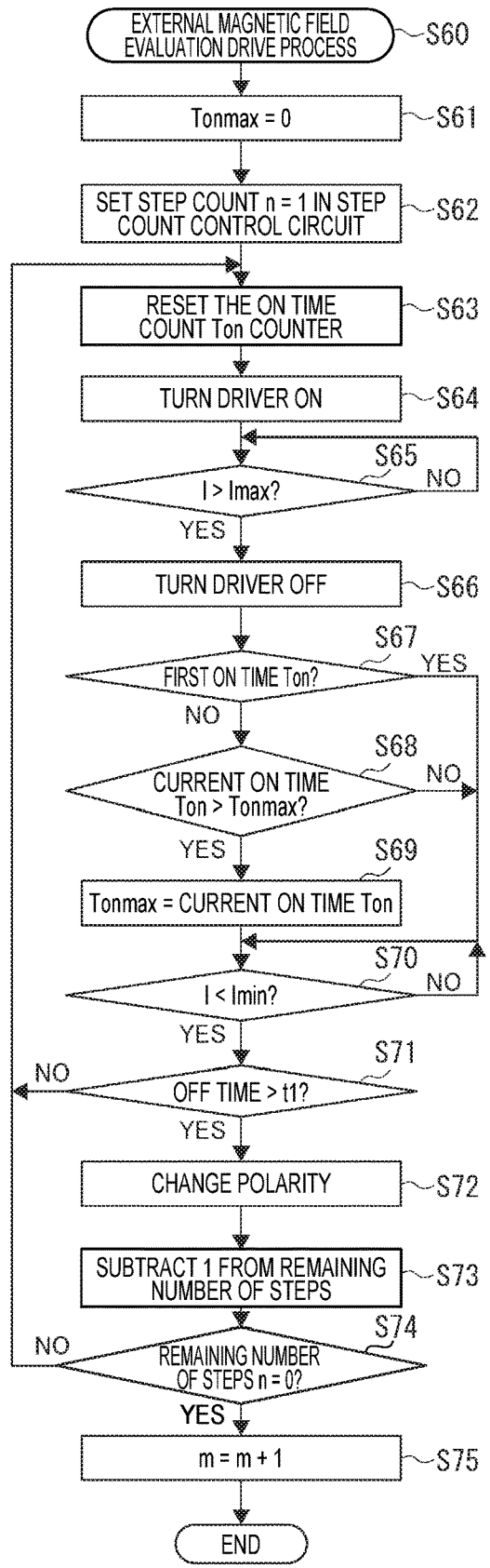
FIG. 15 is a flow chart describing the external magnetic field evaluation drive process in the second embodiment.

When the control circuit 28B ends the first iteration of the external magnetic field evaluation drive process S60, the control circuit 28B executes step S53 in FIG. 14, and stores the value of Tonmax stored in the memory of the CPU 23 of the control circuit 28B to variable Tonmax1, that is, stores the maximum on time Ton not including the first on time Ton.

Motor drive control in the external magnetic field evaluation drive process S60 in this embodiment is the same as the external magnetic field evaluation drive process S10 in the first embodiment, and the drive waveform is therefore the same as shown in FIG. 12 in the first embodiment.

In the example in FIG. 12, the value of variable Tonmax in the first iteration of the external magnetic field evaluation drive process S60 is 800 μsec, and 800 μsec is therefore stored to the variable Tonmax1 in step S53.

The second iteration of the external magnetic field evaluation drive process S60 is the same as the first iteration, and further description thereof is omitted. Note that the value of the variable m indicating the number of steps driven is 2 when the second iteration of the external magnetic field evaluation drive process S60 ends.

When the second iteration of the external magnetic field evaluation drive process S60 ends, the control circuit 28B executes step S55 and stores the value of variable Tonmax to variable Tonmax2.

In the example in FIG. 12, the value of variable Tonmax in the second iteration of the external magnetic field evaluation drive process S60 is 300 μsec, and 300 μsec is therefore stored to the variable Tonmax1 in step S55.

The control circuit 28B then executes step S56 in the same way as step S6 in the first embodiment, and determines whether or not m=180. If the control circuit 28B determines YES in step S56, driving the minute hand 3 ended in the external magnetic field evaluation drive process S60 alone, and drive control of the third motor 43 moving the city hand 5 one step forward ends.

If the control circuit 28B determines NO in step S56, the control circuit 28B executes step S57 to determine whether or not the absolute value of the difference between Tonmax1 and Tonmax2 is greater than or equal to a specific time t2.

This specific time t2 may be set based on the results of previous test applying an external magnetic field to the third motor 43, and in this example t2=400 μsec.

If the control circuit 28B determines YES in step S57, the control circuit 28B determines that the drive waveform of the third motor 43 is unbalanced due to the effects of an external magnetic field. In the example in FIG. 12, the absolute value of the difference between Tonmax1 and Tonmax2 500 μsec, is therefore greater than or equal to the specific time t2, and the control circuit 28B can determine operation is being affected by an external magnetic field.

When the control circuit 28B determines YES in step S57, the control circuit 28B does not execute the rapid drive process of the third motor 43, and after waiting the specific time in step S58, returns to the first iteration of the external magnetic field evaluation drive process S60 and continues the drive process for external magnetic field evaluation. As in step S54, the wait time in step S58 may be set to a time at least long enough for rotor 133 vibration to stop.

When the control circuit 28B determines NO in step S57, the control circuit 28B the control circuit 28 executes the rapid motor drive process S30 to drive the third motor 43 quickly. The rapid motor drive process S30 is the same as in the first embodiment, and further description thereof is omitted.

When the rapid motor drive process S30 ends, the control circuit 28B returns to the process in FIG. 14, and ends drive control of the third motor 43 moving the city hand 5 one step forward.

Effect of Embodiment 2

The third motor control circuit 33B in this second embodiment calculates the difference between the maximum value of the on time Ton when driving with a first polarity and the maximum value of the on time Ton when driving with a second polarity in two consecutive iterations of the external magnetic field evaluation drive process S60, and can therefore determine operation is affected by an external magnetic field when the difference is greater than a specific time t2.

As in the first embodiment, there is therefore no need to provide a magnetic sensor to detect external magnetic fields, and increasing the size and parts cost of the movement 10 can be prevented. More specifically, the electronic timepiece 1 can accurately detect the effects of an external magnetic field without using a magnetic sensor, and can prevent driving the third motor 43 rapidly when exposed to the effects of an external magnetic field.

More particularly, an imbalance in the drive waveform while actually driving the third motor 43 can be determined based on the difference in maximum values of the on time Ton when starting rapid drive control of the third motor 43 that moves the hour hand 2 and minute hand 3, and that operation is affected by an external magnetic field can be determined when the calculated difference is greater than or equal to a specific time t2.

As a result, an external magnetic field that affects driving the third motor 43 can be accurately detected.

Because the rotor 133 is not driven continuously when an external magnetic field is present, and the third motor 43 is driven after waiting a specific time until the rotor 133 completely stops turning, the drive speed becomes slower but the third motor 43 can be driven stably even when affected by an external magnetic field.

Because the third motor control circuit 33B is configured by a dedicated circuit using logic devices, the third motor control circuit 33 enables low voltage drive and reduces power consumption compared with a configuration using a CPU 23, and is particularly well suited to a mobile electronic timepiece 1 such as a wristwatch.

Because the control circuit 28B sets the number of drive steps in the step count control circuit 78 of the third motor control circuit 33B, and updates a variable Tonmax based on the on time Ton, which is a value counted by the counter 79, only variables Tonmax and Tonmax2 need to be stored, the actual drive control of the third motor 43 is handled by the third motor control circuit 33B, and the program enabling the control circuit 28B can be simplified.

Furthermore, because an external magnetic field detector is configured by the control circuit 28B, the specific time t2 used to evaluate if an external magnetic field is present can be written to nonvolatile memory, for example. As a result, the specific time t2 can be changed according to the differences in the specifications of the third motor 43 and differences in the magnetic shield structure in the movement 10, and the effects of an external magnetic field can be accurately detected in different variations of the electronic timepiece 1.

First Variation of Embodiment 2

In the second embodiment the counter 79B measures the on time Ton that is the continuous time of the on state of the driver 51 when driven by the first polarity, and the on time Ton that is the continuous time of the on state of the driver 51 when driven by the second polarity; and the control circuit 28B, which is an external magnetic field detector, detects the presence of an external magnetic field based on the result of comparing a variable Tonmax1, which is the maximum on time Ton measured by the counter 79B other than the first on time Ton when driven with the first polarity, with a variable Tonmax2, which is the maximum on time Ton measured by the counter 79B other than the first on time Ton when driven with the second polarity, but the disclosure is not so limited.

For example, the counter 79B may measure the continuous time of the off state of the driver 51 when driven by the first polarity, and the continuous time of the off state of the driver 51 when driven by the second polarity; and the control circuit 28B, which is an external magnetic field detector, may detect the presence of an external magnetic field based on the result of comparing the maximum off time when driven with the first polarity, with the maximum off time Ton when driven with the second polarity.

Second Variation of Embodiment 2

In the second embodiment the control circuit 28B evaluates the presence of an external magnetic field by comparing the maximum on times in each polarity, but the presence of an external magnetic field may be determined based on the cumulative or average on time.

Alternatively, when the off time is measured, the presence of an external magnetic field may be determined based on the cumulative or average off time instead of the maximum off time.

Further alternatively, the presence of an external magnetic field may be determined based on the difference in the continuous time until the driver 51 is turned off after changing the polarity and turning the driver 51 on.

In other words, the control circuit 28 can evaluate the presence of an external magnetic field based on a parameter that changes with polarity when operation is affected by an external magnetic field.

OTHER EMBODIMENTS

The invention is not limited to the embodiments described above, and can be modified and improved in many ways without departing from the scope of the accompanying claims.

For example, when the control circuit 28, 28B determines an external magnetic field is affecting the third motor 43, the control circuit 28, 28B may control the third motor control circuit 33, 33B to supply to the driver 51 a fixed pulse that can reliably make the rotor 133 turn even in the presence of an external magnetic field. In this case, the stability of driving the third motor 43 can be improved.

In addition, when the control circuit 28, 28B detects an external magnetic field, the control circuit 28, 28B may stop driving the third motor 43 for a specific time, for example, for several seconds or several minutes, and then try driving the third motor 43 again. This is because while driving the third motor 43 is stopped, the user of the electronic timepiece 1 may move away from the speaker or other source of the external magnetic field such that the electronic timepiece 1 is no longer affected by the external magnetic field.

Note that when there is an external magnetic field affecting the third motor 43, the third motor 43 in each of the above embodiments waits a specific time each time after driving one step. The hour hand 2 and minute hand 3 can therefore be moved separately from when an external magnetic field is not present, and the user can know from how the hour hand 2 and minute hand 3 moved that there is disturbance from an external magnetic field. The presence of an external magnetic field may also be indicated by the the small second hand 4 or other indicator or display. In this case, the user can more clearly know that there is disturbance from an external magnetic field, and can move away from that location to avoid the effects of the external magnetic field while selecting the time zone, for example.

The external magnetic field evaluation drive process S10, S60 is executed to detect an external magnetic field when rapidly advancing the hour hand 2 and minute hand 3 starts, but the external magnetic field evaluation drive process S10, S60 may also be executed during normal movement of the hour hand 2 and minute hand 3. Then when the time zone is adjusted, the presence of an external magnetic field may be determined from the detection result of the preceding normal movement, the movement of the third motor 43 controlled based on the result, and operation changed between driving the hands rapidly by constant current control, and driving by a fixed pulse.

The first embodiment and second embodiment may also be combined to detect an external magnetic field based on the on count or off count, and detect an external magnetic field based on the on time or off time. In this event, the accuracy of external magnetic field detection can be improved by comparing both results. Note that when an external magnetic field is detected by either test, an external magnetic field may be determined to be present regardless of the result of the other test.

In the first and second embodiments the on time count Ton or Tonmax time is compared once each using the first polarity and the second polarity, but the external magnetic field evaluation drive process S10, S60 may be applied multiple times with the first polarity, the external magnetic field evaluation drive process S10, S60 may be applied multiple times with the second polarity, and the presence of an external magnetic field evaluated by calculating the difference in the averages of the multiple on time counts Ton or Tonmax times acquired for each polarity. If the external magnetic field evaluation drive process is applied multiple times for each polarity, the effect of an external magnetic field can be determined more accurately.

Because differences in the drive waveform of the third motor 43 with each polarity is evaluated based on the difference in the on time count Ton or Tonmax time, evaluation of forces affecting driving the third motor 43 is not limited to the effects of an external magnetic field. For example, continuous vibrations applied to the electronic timepiece can also be detected.

Motors for which the effects of an external magnetic field is evaluated are not limited to motors for moving hands that indicate time, and may be motors that drive hands indicating other information, such as mode indicators.

The invention is particularly well suited to electronic timepieces having a motor for driving a hand that requires moving rapidly by means of constant current control.

The electronic timepiece 1 described in the foregoing embodiments is a wristwatch, but may be a table clock, for example.

The motor control circuit of the invention is also not limited to a third motor control circuit 33, 33B that moves the hour hand 2 and minute hand 3, and can also be applied to the first motor control circuit 31 or second motor control circuit 32.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:
1. An electronic timepiece comprising:
a motor having a coil and a rotor;
a driver controlled to an on state supplying drive current to the coil, or an off state not supplying drive current to the coil;
a current detector configured to detect a current value flowing through the coil;
a controller configured to control the driver to the on state or the off state according to the current value detected by the current detector;

a polarity changer configured to alternately change the polarity of the drive current to a first polarity and a second polarity when an on time, which is a continuous time of the on state of the driver, or an off time, which is a continuous time of the off state of the driver, is detected to meet a specific condition;

a counter configured to count the number of on states in the first polarity and the number of on states in the second polarity, or the number of off states in the first polarity and the number of off states in the second polarity; and an external magnetic field detector configured to detect an external magnetic field based on a result of comparing the number of on states in the first polarity and the number of on states in the second polarity, or comparing the number of off states in the first polarity and the number of off states in the second polarity, the number of on states and the number of off states counted by the counter.

2. The electronic timepiece described in claim 1, wherein:
the controller controls the driver to resume driving the motor after stopping the motor for a specific time when the external magnetic field detector detects the external magnetic field.

3. The electronic timepiece described in claim 1, wherein:
the controller outputs to the driver a fixed pulse that continues the on time for a specific time or longer when the external magnetic field detector detects the external magnetic field.

4. An electronic timepiece comprising:
a motor having a coil and a rotor;
a driver controlled to an on state supplying drive current to the coil, or an off state not supplying drive current to the coil;
a current detector configured to detect a current value flowing through the coil;
a controller configured to control the driver to the on state or the off state according to the current value detected by the current detector;
a polarity changer that alternately changes the polarity of the drive current to a first polarity and a second polarity when an on time, which is a continuous time of the on state of the driver, or an off time, which is a continuous time of the off state of the driver, meets a specific condition; and
an external magnetic field detector configured to detect an external magnetic field based on a result of comparing an on time in the first polarity and an on time in the second polarity, or comparing an off time in the first polarity and an off time in the second polarity.

5. The electronic timepiece described in claim 4, wherein:
the controller controls the driver to resume driving the motor after stopping the motor for a specific time when the external magnetic field detector detects the external magnetic field.

6. The electronic timepiece described in claim 4, wherein:
the controller outputs to the driver a fixed pulse that continues the on time for a specific time or longer when the external magnetic field detector detects the external magnetic field.

7. The electronic timepiece described in claim 4, wherein:
the external magnetic field detector is configured to detect an external magnetic field based on a result of comparing a maximum value of the on time in the first polarity not including a first on time, and a maximum value of the on time in the second polarity not including a first on time.

8. A motor controller, comprising:
a driver controlled to an on state supplying drive current to a coil of a motor, or an off state not supplying drive current to the coil;
a current detector configured to detect a current value flowing through the coil;
a controller configured to control the driver to the on state or the off state according to the current value detected by the current detector;
a polarity changer that alternately changes the polarity of the drive current to a first polarity and a second polarity when an on time, which is a continuous time of the on state of the driver, or an off time, which is a continuous time of the off state of the driver, meets a specific condition;
a counter configured to count the number of on states in the first polarity and the number of on states in the second polarity, or the number of off states in the first polarity and the number of off states in the second polarity; and
an external magnetic field detector configured to detect an external magnetic field based on a result of comparing the number of on states in the first polarity and the number of on states in the second polarity, or comparing the number of off states in the first polarity and the number of off states in the second polarity, the number of on states and the number of off states counted by the counter.

* * * * *